US007412418B2

(12) United States Patent
Erbey et al.

(10) Patent No.: US 7,412,418 B2
(45) Date of Patent: Aug. 12, 2008

(54) EXPENSE TRACKING, ELECTRONIC ORDERING, INVOICE PRESENTMENT, AND PAYMENT SYSTEM AND METHOD

(75) Inventors: William C. Erbey, Palm Beach, FL (US); Russell G. Bulman, West Palm Beach, FL (US); Robert J. Leist, Singer Island, FL (US); Mary K. Edgecomb, Jupiter, FL (US); Donald Vetal, Jupiter, FL (US); Armand Bonola, Burlington, CT (US); Stephanie M. Hudson, Jupiter, FL (US); Jeffrey M. Neufeld, Wellington, FL (US); Debra Toussaint-Blackman, Boca Raton, FL (US); Rosemary Weaver, St. Cloud, FL (US); Sandy Blum, Lake Worth, FL (US); Federico Bucspun, Boca Raton, FL (US)

(73) Assignee: Ocwen Financial Corporation, West Palm Beach, FL (US)

( * ) Notice: Subject to any disclaimer, the term of this patent is extended or adjusted under 35 U.S.C. 154(b) by 202 days.

(21) Appl. No.: 10/729,019

(22) Filed: Dec. 8, 2003

(65) Prior Publication Data

US 2005/0144125 A1 Jun. 30, 2005

Related U.S. Application Data

(60) Provisional application No. 60/495,103, filed on Aug. 15, 2003, provisional application No. 60/431,438, filed on Dec. 6, 2002.

(51) Int. Cl.
*G06Q 40/00* (2006.01)
(52) U.S. Cl. .......................................... 705/40; 705/35
(58) Field of Classification Search .................. 705/40, 705/35
See application file for complete search history.

(56) References Cited

U.S. PATENT DOCUMENTS

| 6,687,713 | B2* | 2/2004 | Mattson et al. ........... 707/104.1 |
| 7,110,976 | B2* | 9/2006 | Heimermann et al. ......... 705/37 |
| 2002/0111842 | A1* | 8/2002 | Miles ............................. 705/8 |
| 2004/0064389 | A1* | 4/2004 | Force et al. .................... 705/34 |

OTHER PUBLICATIONS

Enzweiler, Albert J; The "sizzle" in client/server systems, Management Accounting v77n8 pp. 22-30 Feb. 1996.*
Kimball; "Tracking your department budgets, commitments, and actuals with dimensional model", Business Wire, Jun. 1, 1999.*

* cited by examiner

*Primary Examiner*—Jagdish N Patel
(74) *Attorney, Agent, or Firm*—Arent Fox LLP

(57) ABSTRACT

Systems and methods for tracking and billing expenses throughout a transaction, such as the sale or management of a real estate property. In one embodiment, a budget is created that details expected incomes on the property and costs associated with the sale or management of the property. The budget may be developed in accordance with specifications, such as line item maxima or total budget maxima, developed by the owner of the property. After a vendor has delivered goods or services described in the budget, the vendor creates an electronic invoice. Payment is delivered to the vendor through an Automated Clearing House system.

35 Claims, 37 Drawing Sheets

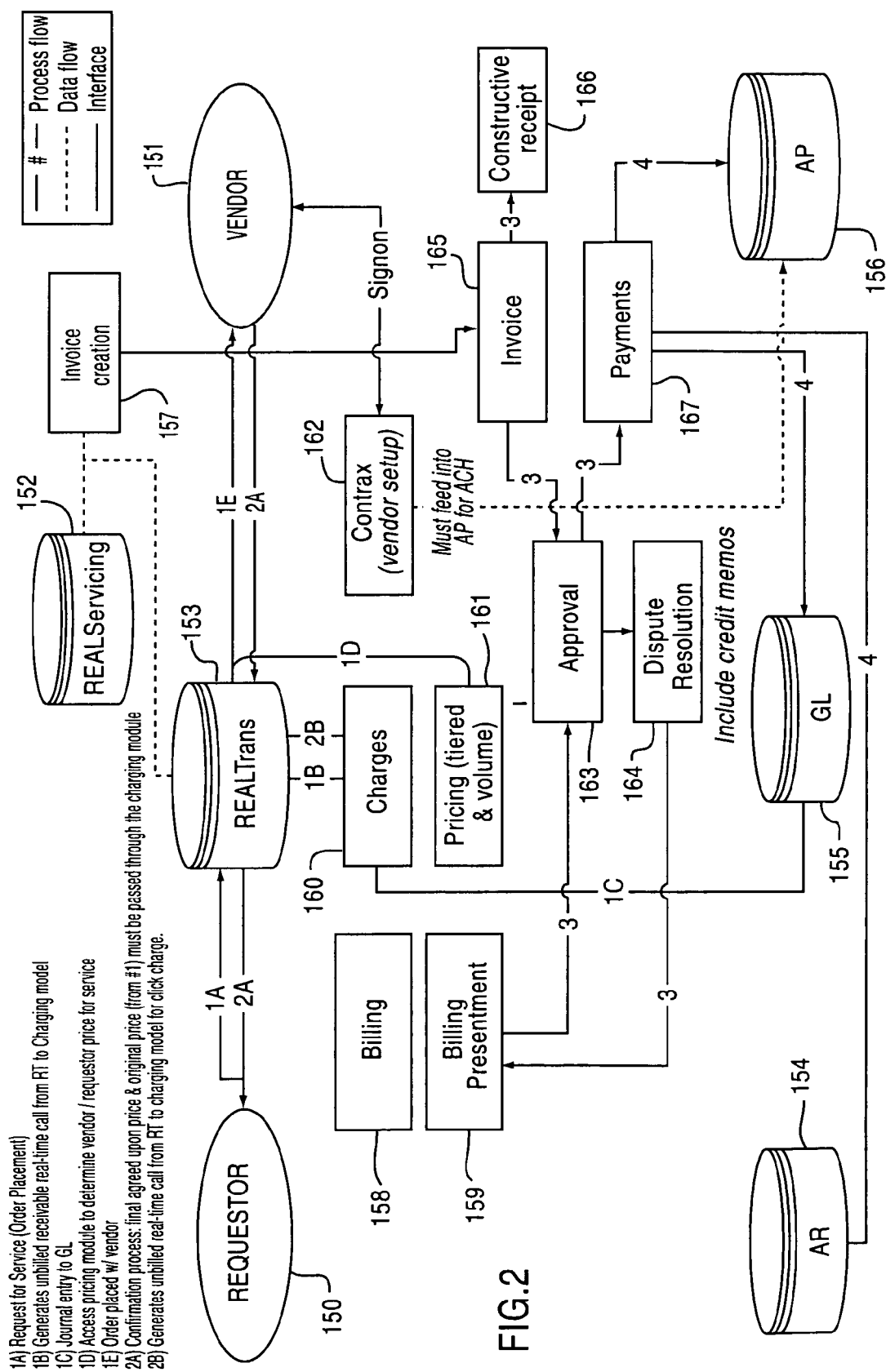

FIG.2

1A) Request for Service (Order Placement)
1B) Generates unbilled receivable real-time call from RT to Charging model
1C) Journal entry to GL
1D) Access pricing module to determine vendor / requestor price for service
1E) Order placed w/ vendor
2A) Confirmation process: final agreed upon price (from #1) must be passed through the charging module
2B) Generates unbilled real-time call from RT to charging model for click charge.

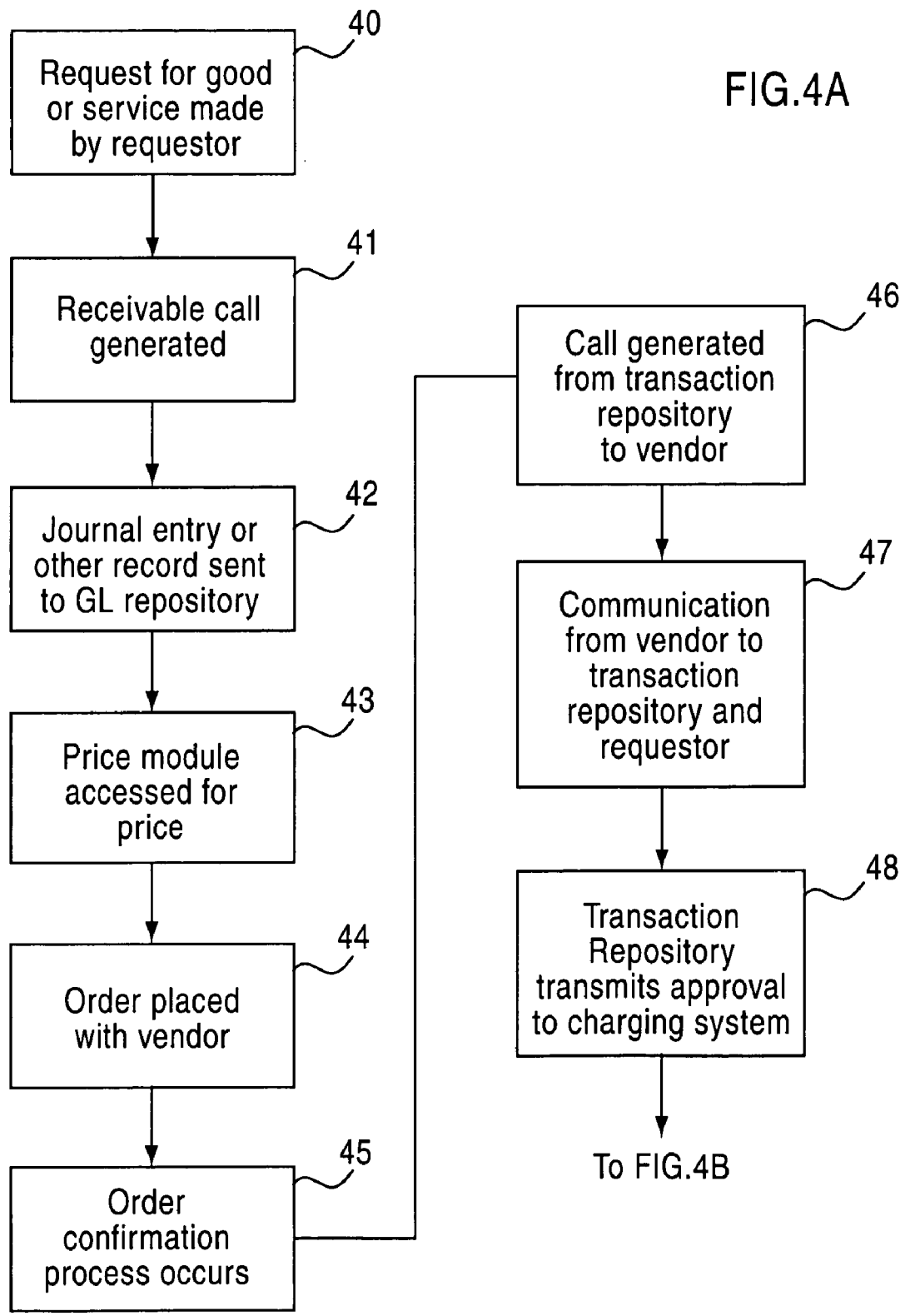

Website Usage Agreement

REALTrans.Com Registration Wizard

You are on Registration Step 1 of 7

By supplying the following information and clicking on agree, you acknowledge that you have FULLY read the following agreement. To complete the registration you must have the authorization to sign the user agreement and have a credit card ready.

CLICK on the links below to view or print out the privacy policy and agreements.

Privacy Policy          Transaction Fee Agreement
Provider Agreement
User Agreement

USER WEB SITE AGREEMENT

1. CLICK "I AGREE"
This User Web Site Agreement ("Agreement") contains the agreement between y 1.1 "we", "us", Company ("you", "your") requesting access to this web site and our proprietary ("Web Site"), and us, REALTrans.com, Inc., a Florida corporation ("REALTrans", "our"), regarding your use of this Web Site. We recommend that you print a copy of this Agreement for your records.
After you read this Agreement, you are required to type your name, title, company name, company address and e-mail address and then click I AGREE to acknowledge and evidence your agreement to the terms and conditions of this Agreement. Furthermore, by using this Web Site, YOU REPRESENT AND WARRANT THAT YOU CAN FORM LEGALLY BINDING CONTRACTS UNDER APPLICABLE LAW, THAT YOU ARE A MERCHANT (AS DEFINED IN SECTION 19 OF THIS AGREEMENT) AND THAT THE INDIVIDUAL EXECUTING THIS AGREEMENT BY ENTERING THE REQUIRED INFORMATION AND BY CLICKING I AGREE HAS

FIG.6

REALTrans.Com Registration Wizard

Welcome to REALTrans registration. Before you begin the REALTrans registration process, please have the following information available:

1. Bank Information:
   Account name, Account number, ABA Routing number

2. Organization Information:
   Name, Business Name (if different), Address, Tax ID number or SSN, Phone number, fax number, Contact for Company, Type of business 3. Type of REALtran   Step 2   Multi-User license depending on the pe
   You may choose eit   your company. You might want to discuss this with your management before you register.
   Single-User License - $50 per year, for one user.
   Multi-User License - $350 per year for 10 users, $25 per year for each additional user.

1.2

We will be collecting relevant information over the next 7 screens.

Next >>

FIG.7

Company Registration

REALTrans.Com Registration Wizard

You are on Registration Step 4 of 7                                    1.4

No Special Characters allowed: "!@#$%"&"[]<>{}\/?;:"

*Company _____ 1.4.1

Business Name (If different): _____ 1.4.2

*Type of Business:    1.4.3
- Individual / Sole Proprietor  ☐ 1.4.3.1
- Corporation ☐ 1.4.3.2
- Partnership ☐ 1.4.3.3
- Other / Specify: _____ 1.4.3.4

*W9 Information

*Exempt from Backup Withholding?  Y ☐  N ☐  1.4.4

*Tax ID Number or SSN: _____ 1.4.5

*Business Address: _____ 1.4.6

*City, State, Zip: ☐ ☐ ☐

*Phone: ☐  1.14

*Fax: ☐  1.15.

Personal Information:  1.4.8

Address: _____ 1.4.8.1

City, State, Zip ☐ 1.4.8.2 ☐

Phone:  ☐  1.4.8.3

Fax: ☐  1.4.8.4

Cell: ☐  1.4.8.5

*e-mail: ☐  1.4.8.6

*I accept terms of the W9 Certification: _____  1.4.7

* Indicates Required Information

FIG.9

REALTrans.Com
Registration Wizard 1.5

You are on Registration Step 5 of 7

Here you will need to create a UNIQUE Login ID for yourself. **No Spaces or Special Characters Allowed :"'!@#$%^&*()<>{}|\/?:;**. Upon entering the Login ID of your choice, we will scan our database to make sure you are the only one with that Login ID. If you are not, you will be brought back to this page allowing you to try again.
*Indicates a Required Field*

What role will your User most often fill when utilizing REALtrans.com?
User Type:

Appraiser ▼ *   1.5.1

Login ID: _____ 1.5.2

Password: * _____ 1.5.3

Confirm Password: _____ 1.5.4

Please choose a question from the drop down list below. In the answer box, type the answer to the question. You will be asked to supply the correct answer if you forget your password.

What is your mother's maiden name?
Answer: ____ 1.5.5

FIG.10

REALTrans.Com
Registration Wizard 1.6

You are on Registration Step 6 of 7

Please complete the information below. The credit card specified here will be for use for your yearly membership.
*Indicates Required Field Card Holder Name:* 1.6.1

Type of Credit Card:* 1.6.2
Visa ▼

Credit Card Number:* 1.6.3

Date Expires:* 1.6.4
08 ▼ / 2003 ▼

Credit Card Billing Address 1:* 1.6.5

Credit Card Billing Address 2: 1.6.6

City, State, Zip * 1.6.7

FIG.11

Bank Account

REALTrans.Com
Registration Wizard 1.7

You are on Registration Step 7 of 8

Please complete the information below. The bank account number will be used for the processing of transactions, fees due and membership fees.
*Indicates Required Field

* Bank Name: [1.7.1]

* Address: [1.7.2]

* Account Number: [1.7.3]

* ABA Routing #: [1.7.4]

FIG.12

Service Areas (Enter the name for this service area in the Service Area Name box. You may enter a brief description for this area in the Description box limited to 255 characters. After clicking on Next you will have your choice of which states, counties, and zip codes you want covered under this service area)

Service Area Information

★ Service Area Name | West Palm |

Service Area Description | Palm Beach |

○ Yes  ◉ No  Would you like to start with an existing service area?

If yes, which one [▸]

1.8.1

( Next ) ( Cancel )

FIG.14

*Service Areas*

| State Selection |
|---|

Please select the "state(s)" to include in the Clewiston Service Area

If you offer service in the entire state, select the state in the table below. If you only offer service within specific counties or zip codes, click on that State to view that state's counties and zip codes.

Click the Save button to save a state selection and return to the Service Areas screen.

Click the Apply button to save state selections and continue Service Area setup.

Be sure to click either the Save or Apply button prior to adding/removing states. If you do not click the Save or Apply buttons before you click on a state link, your selected states will not be saved.

☐ Service Area includes all counties and zip codes in this state.

■ Service Area does not include all counties or zip codes in this state.

| 1.8.2 |
|---|

| 1.8.2.1 |
|---|

( Select All ) ( Deselect All )

C Service Area does not include all counties or zip codes in this state.

| STATES | | | | |
|---|---|---|---|---|
| ☐ ALABAMA | ☐ ALASKA | ☐ ARIZONA | ☐ ARKANSAS | ☐ CALIFORNIA |
| ☐ COLORADO | ☐ CONNECTICUT | ☐ DELAWARE | ☐ DISTRICT OF COLUMBIA | ☐ FLORIDA |
| ☐ GEORGIA | ☐ HAWAII | ☐ IDAHO | ☐ ILLINOIS | ☐ INDIANA |
| ☐ IOWA | ☐ KANSAS | ☐ KENTUCKY | ☐ LOUISIANA | ☐ MAINE |
| ☐ MARYLAND | ☐ MASSACHUSETTS | ☐ MICHIGAN | ☐ MINNESOTA | ☐ MISSISSIPPI |
| ☐ MISSOURI | ☐ MONTANA | ☐ NEBRASKA | ☐ NEVADA | ☐ NEW HAMPSHIRE |
| ☐ NEW JERSEY | ☐ NEW MEXICO | ☐ NEW YORK | ☐ NORTH CAROLINA | ☐ NORTH DAKOTA |
| ☐ OHIO | ☐ OKLAHOMA | ☐ OREGON | ☐ PENNSYLVANIA | ☐ RHODE ISLAND |
| ☐ SOUTH CAROLINA | ☐ SOUTH DAKOTA | ☐ TENNESSEE | ☐ TEXAS | ☐ UTAH |
| ☐ VERMONT | ☐ VIRGINIA | ☐ WASHINGTON | ☐ WEST VIRGINIA | ☐ WISCONSIN |
| ☐ WYOMING | | | | |

FIG. 15    ( SAVE ) ( APPLY ) ( CANCEL )

Service Areas

County Selection

Please identify the counties to be included in this Service Area, if you only offer service within specific zip codes, click the County name to view that county's zip codes.

Click the Save button to save a county selection and return to the State Selection screen.

Click the Apply button to save county selection and continue Service Area setup.

Be sure to click either the Save or Apply button prior to adding/removing counties. If you do not click the Save or Apply button before you click on a county link, your selected counties will not be saved.

( Select All ) ( Deselect All )    1.8.2.2

Z Service Area does not include all zip codes in this county.

State - FLORIDA

| ☐ Alachua | ☐ Baker | ☐ Bay | ☐ Bradford | ☐ Brevard |
|---|---|---|---|---|
| ☐ Broward | ☐ Calhoun | ☐ Charlotte | ☐ Citrus | ☐ Clay |
| ☐ Collier | ☐ Columbia | ☐ Miami-Dade | ☐ DeSoto | ☐ Dixie |
| ☐ Duval | ☐ Escambia | ☐ Flagler | ☐ Franklin | ☐ Gadsden |
| ☐ Gilchrist | ☐ Glades | ☐ Gulf | ☐ Hamilton | ☐ Hardee |
| ☐ Hendry | ☐ Hernando | ☐ Highlands | ☐ Hillsborough | ☐ Holmes |
| ☐ Indian River | ☐ Jackson | ☐ Jefferson | ☐ Lafayette | ☐ Lake |
| ☐ Lee | ☐ Leon | ☐ Levy | ☐ Liberty | ☐ Madison |
| ☐ Manatee | ☐ Marion | ☐ Martin | ☐ Monroe | ☐ Nassau |
| ☐ Okaloosa | ☐ Okeechobee | ☐ Orange | ☐ Osceola | ☐ Palm Beach |

FIG. 16

*Service Areas*

| Zip Code Selection |
|---|

Please identify the zip codes to be included in this Service Area.

Click the Save button to save a zip code selection and return to the County Selection screen.

(Select All) (Deselect All)          | 1.8.2.2.1 |

| County - Alachua | | | | |
|---|---|---|---|---|
| ☐ 32601 | ☐ 32602 | ☐ 32603 | ☐ 32604 | ☐ 32605 |
| ☐ 32608 | ☐ 32609 | ☐ 32610 | ☐ 32611 | ☐ 32612 |
| ☐ 32615 | ☐ 32616 | ☐ 32618 | ☐ 32627 | ☐ 32631 |
| ☐ 32640 | ☐ 32641 | ☐ 32643 | ☐ 32653 | ☐ 32654 |
| ☐ 32662 | ☐ 32667 | ☐ 32689 | ☐ 32694 | |

(Save) (Cancel)

FIG.17

| | |
|---|---|
| States of Connecticut, Delaware, Indiana, Iowa, Illinois, Kansas, Maine, Massachusetts, Michigan, Minnesota, Missouri, Nebraska, New Hampshire, New Jersey, New York, North Dakota, Ohio Pennsylvania, Rhode Island, South Dakota, Vermont, and Wisconsin | $8,000 |
| States of Georgia, Kentucky, Maryland, North Carolina, South Carolina, Tennessee, Virginia, and West Virginia, and the District of Columbia | $7,000 |
| States of Alabama, Arkansas, Florida, Louisiana, Mississippi, Oklahoma, Texas and the Commonwealth of Puerto Rico and all of U.S. Virgin Islands | $7,000 |
| States of Alaska, Arizona, California, Colorado, Hawaii, Idaho, Nevada, Montana, New Mexico, Oregon, Utah, Washington, and Wyoming, and the Pacific Islands of American Samoa, Guam, Wake, Midway, and the Commonwealth of Northern Mariana Islands | $6,000 |

FIG.18

Expense Type Update

Sort by:
- ◉ ID
- ○ Name

| Exp Cde | Expense Descr | Ant Exp | Real Exp | Seq | Cr | Class Code | Fee Type | Pyf Mtrx | Pmt Mtrx | Cap Exp | Sta Co |
|---|---|---|---|---|---|---|---|---|---|---|---|
| FB56 | Hoa Dues/Special Assessments (Re | no | | 000 | N | | | N | N | yes | FB5 |
| FB57 | Exterior Repairs (Reo) | no | | 000 | N | | | N | N | yes | FB5 |
| FB58 | Landscaping (Reo) | no | | 000 | N | | | N | N | yes | FB5 |
| FB59 | REO Valuation Cost | no | | 000 | N | | | N | N | yes | FB5 |
| FB60 | Marketing Expense (Reo) | no | | 000 | N | | | N | N | yes | FB6 |
| FB61 | Cash For Keys (Reo) | no | | 000 | N | | | N | N | yes | FB6 |
| FB62 | Trashout (Reo) | no | | 000 | N | | | N | N | yes | FB6 |
| FB63 | Cleaning (Reo) | no | | 000 | N | | | N | N | yes | FB6 |
| FB64 | Pool Maintenance (Reo) | no | | 000 | N | | | N | N | yes | FB6 |
| FB65 | Termite Treatment (Reo) | no | | 000 | N | | | N | N | yes | FB6 |
| FB66 | Valuation Review Fee | no | | 000 | N | | | Y | Y | yes | FB6 |
| △ FB67 | Broker Fees (Reo) | no | | 000 | N | | | N | N | yes | FB6 |

[Update]  [New]  [Delete]  [OK]

FIG.19

| Description | Repaired #1 | Actual | Variance | VA Controlled Limit | VA-Budget Variance | VA-Actual Variance |
|---|---|---|---|---|---|---|
| +Property Value | 0.00 | 0.00 | 0.00 | | | |
| +Estimated Repair Cost | 0.00 | | 0.00 | | | |
| Anticipated Sale Amount | 112,000.00 | 105,000.00 | 7,000.00 | | | |
| Total Marketing Months | 5.00 | | 5.00 | | | |
| +Taxes | (1,053.00) | 0.00 | (1,053.00) | | | |
| +Agent Commissions | (6,720.00) | (6,300.00) | (420.00) | | | |
| +Repairs and Maintenance | (14,087.50) | 0.00 | (14,087.50) | (10,000.00) | 4,087.00 | 0 |
| +Legal | 0.00 | 0.00 | 0.00 | | | |
| +Other | (2,880.00) | (1,838.00) | (1,042.00) | (3,000.00) | (120.00) | (1,162.00) |
| +Inspections | 0.00 | 0.00 | 0.00 | | | |
| +Income | 0.00 | 0.00 | 0.00 | | | |
| Net Present Value (NPV) | $7,823.46 | 105,000.00 | (7,176.50) | (13,000.00) | | (1,162.00) |

FIG.20

| Budget Line Items For As-Is (Viewing: All Budget Lines) | | | | | | |
|---|---|---|---|---|---|---|
| Description | Total Amount | Bid | Frequency | Exp Code | Ctgy Code | VA Over | APPROVE |
| ▲ Property Value | 0.00 | | | | | 6.1 | 6.2 |
| Asset Value | 92,000.00 | | | | | | |
| Appraised Value | 92,000.00 | | | | | | |
| BPO Value | 92,000.00 | | | | | | |
| Estimated Repair Cost | 0.00 | | One-Time | | | | |
| Anticipated Sale Amount | 92,000.00 | | | | | | |
| Total Marketing Months | 4.00 | | | | | | |
| Taxes | 1,053.00 | | | | | | |
| Real Estate Taxes | 1,053.00 | | One-Time | FB28 | FB28-02 | 53.00 | ☑ |
| HOA Fees | 0.00 | | Monthly | FB56 | FB56 | | |
| Agent Commissions | 5,520.00 | | | | | | |
| Listing Agent Commission | 2,760.00 | | One-Time | COM | FB67-01 | | |
| Selling Agent Commission | 2,760.00 | | One-Time | COM | FB67-02 | | |
| Agent Sales incentives | 0.00 | | One-Time | COM | FB67-03 | | |
| Repairs and Maintenance | 5,250.00 | | | | | | |
| General Repairs | 0.00 | | One-Time | FB53 | FB53-05 | | ☑ |
| Roof | 0.00 | | | | | | |
| Property Preservation | 1,850.00 | | | | | 350.00 | |
| Lock Changes | 150.00 | | One-Time | FB53 | FB53-01 | | |
| Trashout | 1,500.00 | | One-Time | FB62 | FB62 | | |
| Winterizing | 200.00 | | One-Time | FB53 | FB53-02 | | |
| Utilities | 1,250.00 | | | | | | |

| Info | News | Register | OK | View | Bid | Child Lookup | APPLY |

FIG. 21

To: VA Contact@va.com
Subject: Approve Ocwen Invoice above allowable.

The following workorder is outstanding with an amount over the VA Allowable per state. Please review the workorder for approval. Thank you.

Workorder Summary:

| Order Date | 23-Jun-03 |
|---|---|
| Loan# | 68955470 |
| State | CA |
| Order# | 12345-554 |
| Amount | $ 550.00 |
| Controlled Amount | $ 500.00 |
| Variance | $ 50.00 |
| Due Date | 23-Jul-03 |

Approve Order
Review Order in REALServicing

FIG.22

| Budget Date | Loan # | State | Fee Type | Pending Amount | Controlled Amount | Due Date | Approve | Approved Amount |
|---|---|---|---|---|---|---|---|---|
| 7/15/03 | 100037902 | CA | 14-61 | 550.00 | 500.00 | 7/31/03 | ☑ | 550.00 |
| 7/15/03 | 100052874 | FL | 14-61 | 550.00 | 500.00 | 7/31/03 | ☑ | 550.00 |
| 7/15/03 | 100096547 | GA | 14-61 | 550.00 | 500.00 | 7/31/03 | ☑ | 550.00 |
| 7/15/03 | 100036985 | IA | 14-61 | 550.00 | 500.00 | 7/31/03 | ☑ | 550.00 |
| 7/15/03 | 100087459 | AZ | Property | 6,200.00 | 6,000.00 | 7/31/03 | ☑ | 6,200.00 |
| 7/15/03 | 100039115 | FL | Property | 7,500.00 | 7,000.00 | 7/31/03 | ☑ | 7,250.00 |

3. Marketing Update

Applicable Auth Expenses: 0.00
Applicable Paid Expenses: 0.00  VA Allowable per State Limit: $7,000
Total Applicable Expenses: 7,500.00  VA Overage per budget: $500.00  Total Exp Lmt: 0.00

| Work Order# | Line Item | Exp Cde | Cab Cde | Description | Authorized Amt | Auth | Work Start Dt | Work End Dt | Approved St By | Client Auth | Changed By | VA Approved By | VA Approved Amount |
|---|---|---|---|---|---|---|---|---|---|---|---|---|---|
| 13236314 | 12300 | FB53 | FB53-01 | Lock Changes | 150.00 | 01/10/2003 | | | wa gleason | | gleason | smith | 1500 |
| 13236316 | 12500 | FB52 | FB62 | Trashout (Reo) | 1,500.00 | 01/10/2003 | | | wa gleason | | gleason | | |
| 13236317 | 12791 | FB28 | FB36-02 | Real Estate Taxes | 1,053.00 | 01/10/2003 | 12/25/2002 | 12/26/2002 | wa gleason | | gleason | | |
| 13236318 | 13918 | Ns | Hsz | Hazard Insurance Premiums | 920.00 | 01/10/2003 | | | wa gleason | | gleason | | |
| 13236319 | 15100 | FB53 | FB63 | Cleaning (Reo) | 400.00 | 01/10/2003 | | | wa gleason | | gleason | | |
| 13236320 | 15200 | FB58 | FB56 | Landscaping | 100.00 | 01/10/2003 | 01/10/2003 | 02/09/2003 | wa gleason | | gleason | | |
| 13236321 | 15100 | FB55 | FB55-01 | Electricity | 150.00 | 01/10/2003 | 01/10/2003 | 02/09/2003 | wa gleason | | gleason | | |
| 13236322 | 19000 | FB53 | FB53-03 | Emergency Repairs | 1,000.00 | 01/10/2003 | | | wa gleason | | gleason | | |

FIG. 25

Review Order Detail

Work Order # 13236314
Line Item: 12300  Lock Changes

Expense Cde: 7853   Property Preservation (Reo):
Category Cde: 7553-01   Lock Changes
Acct. Cde Descr:
Vendor: 7975
Subvendor: 7975

Authorized Amt: 150.00    Authorized Dt: 01/10/2003    Exp Limit: 0.00
Work Start Dt: /  /       Work End Dt: /  /            Exp Code Tot: 9,737.50

Status:  ○ Not Approved           ☐ Validation Rec'd        VA Approval
         ⦿ Work Approved          ☐ Lien Waiver Rec'd       ⦿ Approved
         ○ Canceled                                          ○ Not Approved
         ○ Invoiced                                          Approved Amount Approved By: gleason   Vickie Gleason                        100.00
Client Auth:                                                 Ctgy Limit: 0.00
                                                             Ctgy Code Tot: 150.00

[OK]  [Cancel]  [Apply]  [New]  [Bid]

FIG.26

Work Order Maintenance

Work Order # 13236920
Line Item: 12300  Landscaping
Expense Cde: FBSC  Landscaping (Reo):
Category Cde: FBFE  Landscaping
Acct. Cde Descr:
Vendor: 7975
Subvendor: 7975
Authorized Amt: 100.00    Authorized Dt: 01/10/2003    Exp Limit: 0.00
Work Start Dt: 01/10/2003   Work End Dt: 02/09/2003    Exp Code Tot: 9,737.50
Status: ○ Not Approved      ☐ Validation Rec'd
        ◉ Work Approved     ☐ Lien Waiver Rec'd
        ○ Canceled
        ○ Invoiced
Approved By: gleason   Vickie Gleason     Ctgy Limit: 0.00
Client Auth:                               Ctgy Code Tot: 100.00

[OK] [Cancel] [Apply] [New] [Bid]

Available Vendors for Class\FB58 for Area List

| Vendor Name | Vendor ID | AP Vendor Number | Priority | Address |
|---|---|---|---|---|
| Commercial Listing Service | 5955 |  | Secondary | 910 16th Street S |
| Fannie Mae | 6656 | 25585 | Secondary | 2 Galleria Tower |
| Long and Foster | 4120 | 38641 | Secondary | 4650 East West H |
| Market Intelligence, Inc. | 4716 | 12484 | Secondary | Birchwood Office |
| National Asset Disposition Service LLC | 6166 | 21951 | Secondary | 1991 Village Park |
| Ocwen Federal Bank | 7076 |  | Secondary | REO Dept. 1675 |
| RE/MAX | 2460 | 38640 | Secondary | 1416 S. Huntington |
| Re/Max Capital City | 7975 |  | Secondary | 1420 W Washingto |
| REMAX Properties | 6529 | 30136 | Secondary | 8201 Cantrell Suite |
| Safeguard Properties Inc. | 5202 | 7556 | Secondary | 4700 Rockside Rd |

[Choose] [Cancel]

[OK] [Cancel] [Apply] [New] [Bid]   Ctgy Code Tot: 100

FIG. 27

WORKSTATION  REPORTS  ADMIN  VENDOR ADMIN  HELPFUL INFO  LOGOFF

REALTrans.com™

Options
Create New File
Custom Search
Bulk Management
Bulk Management

*Enter File #* [ ] Go

*Enter Borrower Last Name* [ ] Go

Work Queue  (Refresh)  Select View ▼  Re-Query

| FILES | | | ORDERS | | |
|---|---|---|---|---|---|
| Today's Files | Last 90 Days | | Today's Orders | Last 90 Days | New |
| Last 7 Days | New Msgs | | Last 7 Days | Due Today | Late |
| Last 30 Days | New Docs | | Last 30 Days | New Docs | New Forms |

For other periods, use Custom Search.

*Vendor Response*

| Requestor Terms | Property Address/Borrower | Vendor Responses | | Comments |
|---|---|---|---|---|
| REO Property Listing | Brookefields Bangatore, NE 46675 | Vendor Order N⊔ [10.1] [10.2] | | |
| Re- File Number: albinaadranjini | Patel, Albina | ☐ Accept Order | | |
| | | ☐ Decline Order | | 10.3.1 |
| | [10.3] | ☐ Conditionally Accept (Propose New Terms) | | 10.3.2 |
| Doc Date: 7/17/2003 | | Doc Date: [ ] | | 10.3.3 |
| Received Order Prices: $500.00 | | Received Order Prices: [ ] | | |
| Received Assoc Order Code: $200.00 | | Received Assoc Order Code: [ ] | | |
| | | ☐ Assign Order  Mea Vendor ▼ | | |

FIG. 28

O. Order Inquiry

Order Date >= 07/26/03

| Order# | Loan Number | Exp Cde | Cnt Cde | Order Date | Due Date | Stat | Process Fi |
|---|---|---|---|---|---|---|---|
| 12345-111 | 100045000 | FB22 | APP | 7/15/03 | 8/15/03 | D | |
| 12345-123 | 100121000 | FB82 | APP | 7/15/03 | 8/15/03 | CC | |
| 124545-11 | 100078900 | FB85 | APP | 7/15/03 | 8/15/03 | D | |
| 12345-111 | 100012345 | FB75 | APP | 7/15/03 | 8/15/03 | D | |

10.2.1

Sort By:
- ⊙ Order Number
- ○ Loan Number

Status:
- ☐ Cancelled
- ☐ Cond Confirmed
- ☐ Confirmed
- ☐ Completed
- ☐ Declined
- ☐ Upload Failed
- ☐ File Closed
- ☐ New
- ☐ Open
- ☐ Pend Order Info
- ☐ Due
- ☑ All

[Info] [OK] [Refresh] [History] [Sub Order] [View] [View All]

FIG.29

Electronic Invoice Form - REO Properties

General Information 13.1

REMAX-WPB 13.1.1   Property Number 1000045279 13.1.3   Invoice Date 7/31/03 13.1.5
1213 Mahogany Place 13.1.2 Order Number 1234-56789 13.1.4 Requested Invoice Payment Date 8/15/03 13.1.6
Jupitor, FL 33458

Must be at least 2 business days after invoice

Attach Supporting Documentation

| 1 | C:\Mydocuments\roofphoto.jpg | Browse 13.1.7 |
| 2 | | Browse |
| 3 | | Browse |

General Information 13.2

13.2.1 Ordered from REALTrans Support1   Invoice Number [        ] Auto-Add
13.2.2 Ordered by REALTrans Support QA 13.2.3   13.2.12
Delivery Date 7-38-2003 13.2.4   Amount billed to date 200.00
Price (per requestor) $3,000.00 13.2.6

Add New Item 18 max   Comments   13.2.10 Amount   13.2.11 *Reference Acount#

Service Performed

| 1.) | Roofing Materials | For all materials | 1,000.00 | | 13.2.13 |
| 2.) | Crane Rental | Bob's Crane Rental - 1 day | 500.00 | | 13.2.14 |
| 3.) | Labor | For 1/2 the labor changes | 500.00 | | 13.2.15 |
| 13.2.7 | 13.2.8 | 13.2.9 Enter Sales Tax | 90.00 | | 13.2.16 |
| | | Total Invoice | 2,090.00 | | |
| | | Less: Transaction Fees | (20.00) | | |
| | | Net Due | 2,070.00 | | |

*Customer account # for utilities, phone, etc

FIG. 31

Invoice Detail View Options

View Options:  ◉ Include All Transactions
　　　　　　　 ○ Only Rejected Transactions
　　　　　　　 ○ Approve VA Overages Tran Type(s): [ * ▼ ]

Loan Nbr - From: [ ▼ ]
To: [ zzzzzzzz ▼ ]

Tran Amt - From: [ 999,999,999.99- ]
To: [ 999,999,999.99 ]

Number of Payments: [ ? ]

Load Source: [ ▼ ]

Users: [ hudson, Collector, PerfColl, REOCOLL ] [ Select Users ]

[ OK ] [ Cancel ] [ Reset ]

FIG.32

| Date | Loan # | State | Dept | Loan Type | Vendor# | Order# | Pending | Budgeted Amount | Invoiced Amount | Controlled Amount | Due Date | Approve |
|---|---|---|---|---|---|---|---|---|---|---|---|---|
| 23-Jun-03 | 68955470 | CA | BK | VA | 56468-654 | 12345-554 | Submitted | 500.00 | 550.00 | 500.00 | 23-Jul-03 | ☐ |
| 23-Jun-03 | 68945612 | AZ | EV | FHA | 5587-854 | 32115-654 | Submitted | 300.00 | 325.00 | 300.00 | 23-Jul-03 | ☐ |
| 2-Jul-03 | 68978451 | CO | FC | Conv | 2545-65 | 05-65448-1 | Submitted | 400.00 | 450.00 | 400.00 | 2-Aug-03 | ☐ |
| 11-Jul-03 | 68978321 | GA | REO | Conv | 65488-321 | 002-65447-05 | Submitted | 600.00 | 789.00 | 600.00 | 11-Aug-03 | ☐ |

FIG.33

Review Invoice Detail

Work Order # 13236314
Line Item: 12300 ▶ Lock Changes
Expense Cde: 7853 ▶ Property Preservation (Reo):
Category Cde: 7553-01 ▶ Lock Changes
Acct. Cde Descr: ▶
Vendor: 7975 ▶
Subvendor: 7975 ▶
Authorized Amt: 150.00  Exp Limit: 0.00
 Exp Code Tot: 9,737.50
Work Start Dt: / /  ▶ Authorized Dt: 01/10/2003 ▶
 Work End Dt: / / ▶

Status: ○ Not Approved ☐ Validation Rec'd
 ● Work Approved ☐ Lien Waiver Rec'd
 ○ Canceled
 ○ Invoiced Approved By: gleason ▶ Vickie Gleason
Client Auth: ▶  Ctgy Limit: 0.00
 Ctgy Code Tot: 150.00

[OK] [Cancel] [Apply] [New] [Bid]

FIG.34

Review Invoice Detail

Work Order # 13236314
Line Item: 12300 ▶ Lock Changes
Expense Cde: 7853 ▶    Property Preservation (Reo):
Category Cde: 7553-01 ▶  Lock Changes
Acct. Cde Descr: ▶
Vendor: 7975 ▶
Subvendor: 7975 ▶

Authorized Amt: 150.00 ▶              Authorized Dt: 01/10/2003 ▶      Exp Limit:        0.00
Work Start Dt:   /  /   ▶              Work End Dt:    /  /      ▶      Exp Code Tot: 9,737.50

Status:  ○ Not Approved                ☐ Validation Rec'd
        ● Work Approved                ☐ Lien Waiver Rec'd
        ○ Canceled
        ○ Invoiced Approved By: gleason ▶  Vickie Gleason
Client Auth:         ▶                                                  Ctgy Limit:       0.00
                                                                        Ctgy Code Tot:  150.00

[Cancel]  [OK]         [Apply]                      [New]  [Bid]

EXPENSE TRACKING, ELECTRONIC ORDERING, INVOICE PRESENTMENT, AND PAYMENT SYSTEM AND METHOD

This application claims priority from U.S. Provisional Application Ser. No. 60/431,438 titled "Method and System for Expense Tracking," filed Dec. 6, 2002, and U.S. Provisional Application Ser. No. 60/495,103 titled "Electronic Ordering, Invoice Presentment, and Payment System and Method," filed Aug. 15, 2003. The entirety of each of those provisional patent applications is incorporated herein by reference.

BACKGROUND OF THE INVENTION

1. Field of the Invention

The present invention relates to a method and system for electronic ordering, invoice presentment, and payment.

2. Background of the Technology

There exist in the art paper-based methods and systems for payment of invoices, but these systems are typically slow and costly for completing transactions. Automatic payment approval and presentment processes are also known, in which electronic invoices are provided and approved, but these processes do not include all functions necessary for completion of a transaction (including, for example, payment). It is further known to provide electronic payment approval and dispute resolution processes, but without other necessary features for completion of a transaction.

There remains an unmet need in the art to provide a wide range of electronic ordering, invoice presentment, and payment functions within a single method and system, which are useful, for example, for large organizations, such as mortgage service companies.

SUMMARY OF THE INVENTION

The present invention relates to the automated ordering, invoice presentment, and payment of third party goods and services. One embodiment of the present invention incorporates various aspects of applicant's copending U.S. patent application Ser. No. 09/512,845 titled "Method of Workflow Processing Through a Computer Network," filed Feb. 25, 2000, and copending U.S. patent application Ser. No. 10/102,104 titled "Management and Reporting System and Process for Use with Multiple Disparate Data Bases," filed Mar. 19, 2002, each of which is incorporated herein by reference.

An embodiment of the present invention provides an automated and paperless method and system that combines presentment of invoices, use of an Automated Clearinghouse (ACH) system, electronic referencing of orders to presentment, electronic approval of payment, completion of payment via a network, such as the Internet or an intranet, and reconciliation, some or all of which occur online or via a processor or processors (one or more portions of the overall process also referred to interchangeably herein as "performing automated commerce"). In operation, for example, the present invention allows participants (e.g., vendors, payors) to complete transactions wholly via the network using terminals and servers coupled to the network. Thus, for example, paper invoices are unnecessary, as electronic approval of delivery of goods or services is made, an ACH or other similar system assures transfer of payment to appropriate bank accounts, and transaction data is stored in a repository, such as a database.

In one embodiment of the present invention, automatic payment and invoicing functionality interfaces with a company's existing software infrastructure. Users can therefore use the invention in conjunction with business software such as spreadsheet software or financial software to perform financial transactions.

Features of the present invention include the following:

1) Transaction system (e.g., REALTrans) vendor enrollment integration with other stand alone vendor systems (e.g., REALServicing and Infinium);

2) Expense Tracking Work Order authorization process;

3) Expense Tracking budgetary controls consistent with payor requirements;

4) Payor electronic approval of controlled spending overages via a transaction system (e.g., REALTrans);

5) Transaction system (e.g., REALTrans) automated electronic vendor invoice presentment and storage, with storage structured under, for example, asset number, and capability to automatically store invoices, copies of checks, and images (e.g., photographs);

6) Capability to print invoices;

7) Vendor payment authorization and processing system (e.g., Infinium) consistent with system requirements;

8) Calculation, assessment, and deduction of a transaction fee from payments;

9) Electronic or other payment of vendor invoices through an ACH system by providing an interface between an Accounts Payable application (e.g., Infinium); and an ACH service provider;

10) Automated billing of related invoices to the payor upon closing of a property by a direct interface between the Accounts Payable and Accounts Receivable applications; and 11) Capability to identify unfunded budget items necessary to control trailing expenses.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

FIG. 2 is an overview representative diagram of various system elements of an embodiment of the present invention.

FIGS. 4A and 4B show an example flow diagram of a process for providing ordering, invoice presentment, and payment, in accordance with an embodiment of the present invention.

FIGS. 6-17 are example Graphical User Interface (GUI) screens that are presented to a user in accordance with an embodiment of the present invention.

FIG. 18 is an example table showing payor budget limits, in accordance with an embodiment of the present invention.

FIGS. 19-34 are example Graphical User Interface (GUI) screens that are presented to a user in accordance with an embodiment of the present invention.

DETAILED DESCRIPTION

Embodiments of the present invention relate to systems and methods for managing real estate transactions between a real estate owner or other property holder and one or more vendors. For example, the real estate owner is, in some cases, a corporation, bank, or other large entity with multiple real estate owned properties (properties). The real estate owner orders one or more services from the vendors in connection with the sale or management of a property or other transaction. The real estate owner is responsible for paying the vendors and is therefore interchangeably referred to herein as a "payor."

In some embodiments, the invention relates to systems and methods for tracking expenses in conjunction with a transaction, such as the sale or management of a property. The invention also relates to systems and methods for automated invoicing of goods and services. In one embodiment, the invention contains budget restrictions, such as a total budget maximum or a line item maximum for a particular item. Goods and services ordered or invoiced that exceed the budget restrictions must be approved by the payor and/or an employee of the company providing software services. The company managing the property on behalf of the real estate owner is interchangeably referred to as a Real Estate Owned company or an REO, and employees or managers at the REO are referred to as REO employees or REO managers.

In one embodiment, the REO manages properties for a real estate owner. For example, a mortgage company may select the REO to manage the property because the mortgage holder is no longer making mortgage payments. In this case, the REO is responsible, for example, for collecting mortgage payments, for ordering repairs and other services, or for attending to the sale or foreclosure of the property. As another example, the property may have been foreclosed, and the property may belong to the REO itself, or to another owner.

Embodiments of the present invention also relate to systems and methods for automated payment through, for example, an ACH system. After an invoice has been approved, the payor's account may be debited and the vendor's account may be credited. The invention also provides for fees, such as transaction fees, to be charged to the vendor and paid to the provider of software services.

FIGS. 1A-1D contain various aspects of a flow chart of functionality of interacting portions of a transaction module (e.g., REALTrans), a service ordering module (e.g., REALServicing), and a payment module (e.g., Infinium) for an example payor, in accordance with an exemplary implementation of an embodiment of the present invention. In this and subsequent examples, the exemplary payor or real estate owner is also referred to herein as "VA."

Figure 1A:
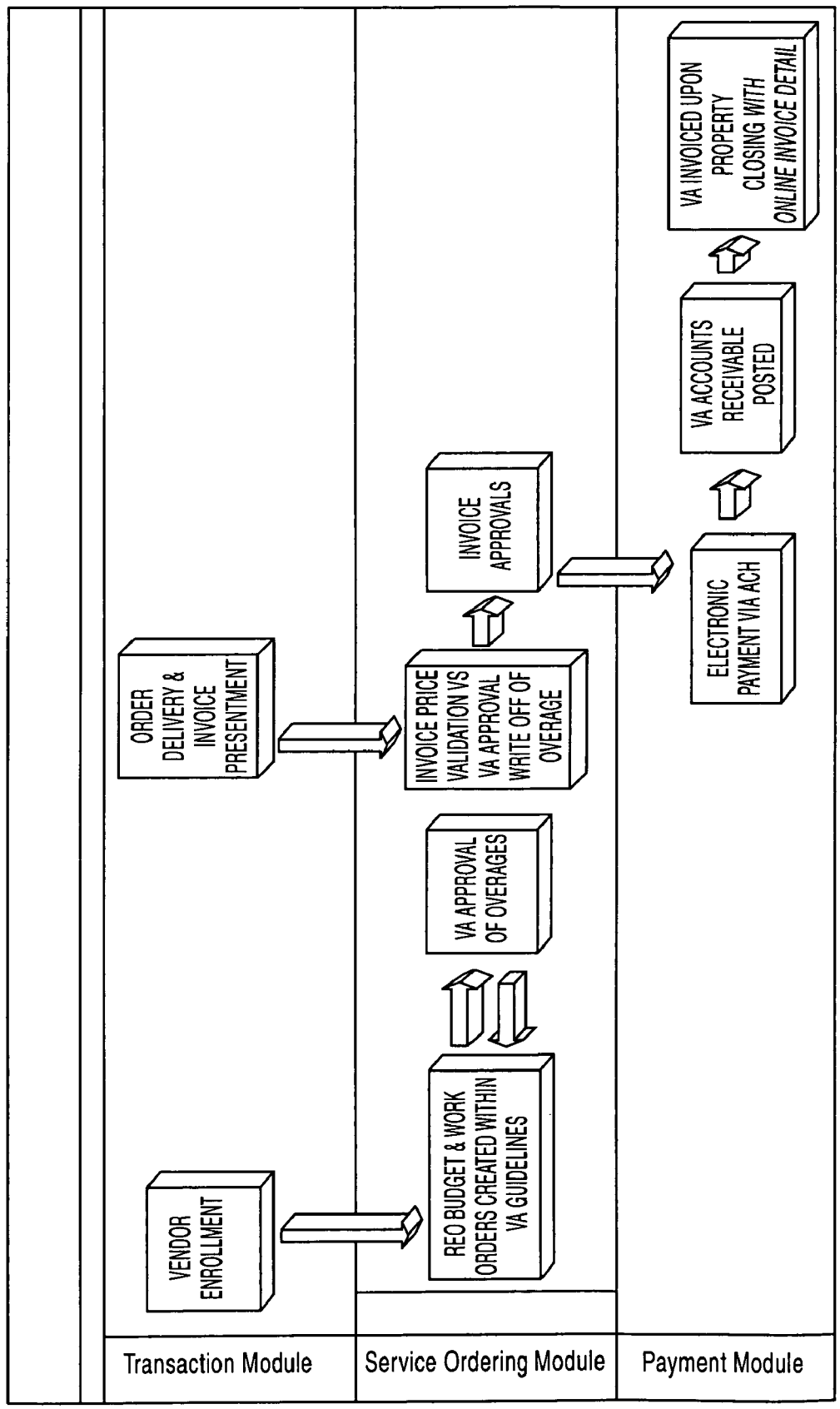
FIGS. 1A-1D contain various aspects of a flow chart of functionality of interacting components for an example payor (VA), in accordance with an exemplary implementation of an embodiment of the present invention.

As shown in FIG. 1A, in one embodiment, a transaction module, system, or component provides functionality for vendor enrollment and for order delivery and invoice presentment. A service ordering module, system, or component provides functionality for creating budget and work orders within payor (VA) guidelines and for payor approval of overages. The service ordering module also receives invoice information from the transaction module and, using this information, provides functionality for invoice price validation and/or payor approval and write off of overage spending. The transaction module also provides functionality for invoice approval.

In this embodiment, a payment module, system, or component receives invoice approval information from the service ordering module. The payment module provides functionality for electronic payment via an ACH, and also for a posting to the payor's accounts receivable (AR) account. The payment module also provides functionality for providing a payor invoice upon the completion of a transaction, such as the closing of a property, with an online invoice detail.

Figure 1B:
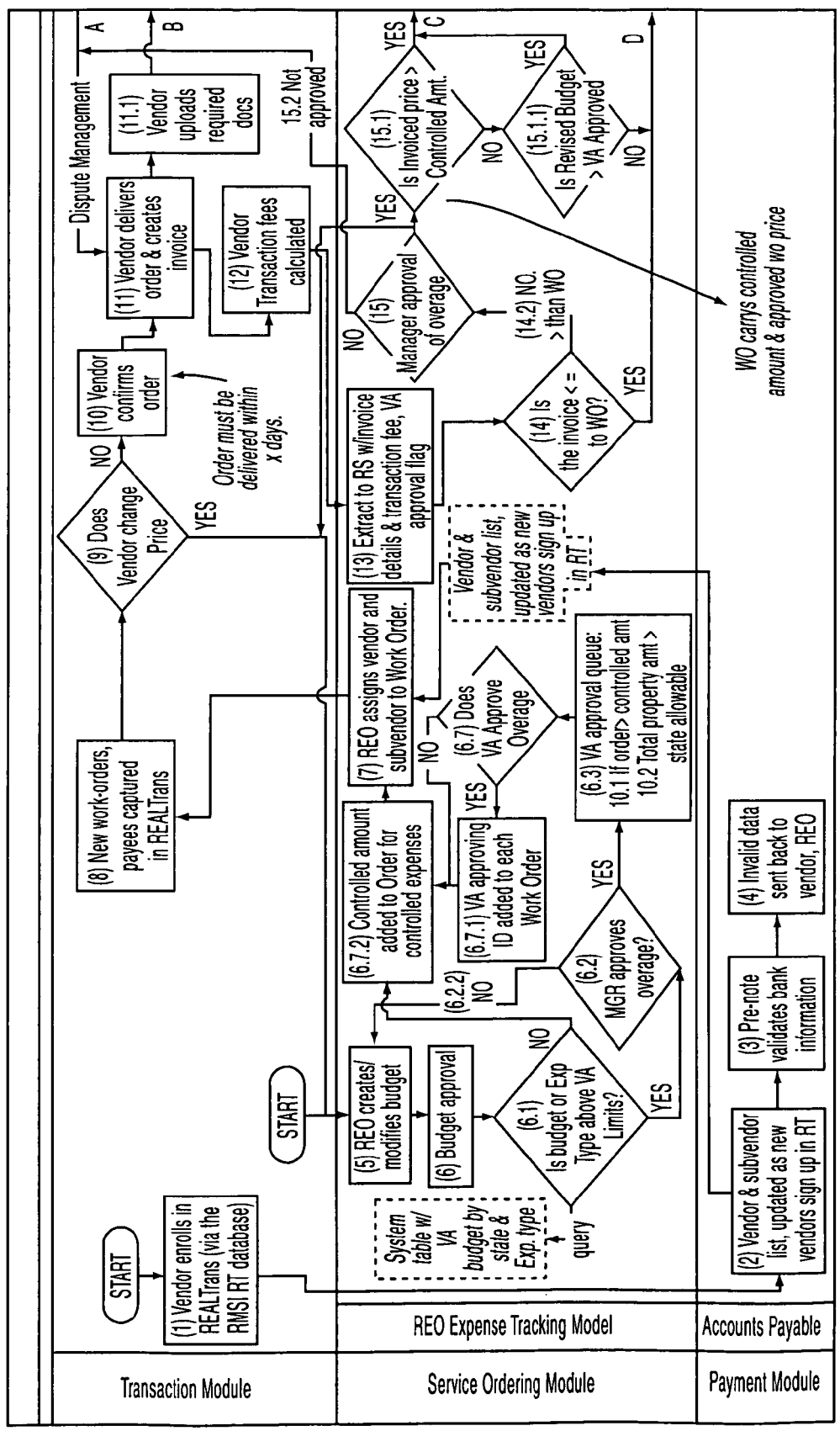
Figure 1C:
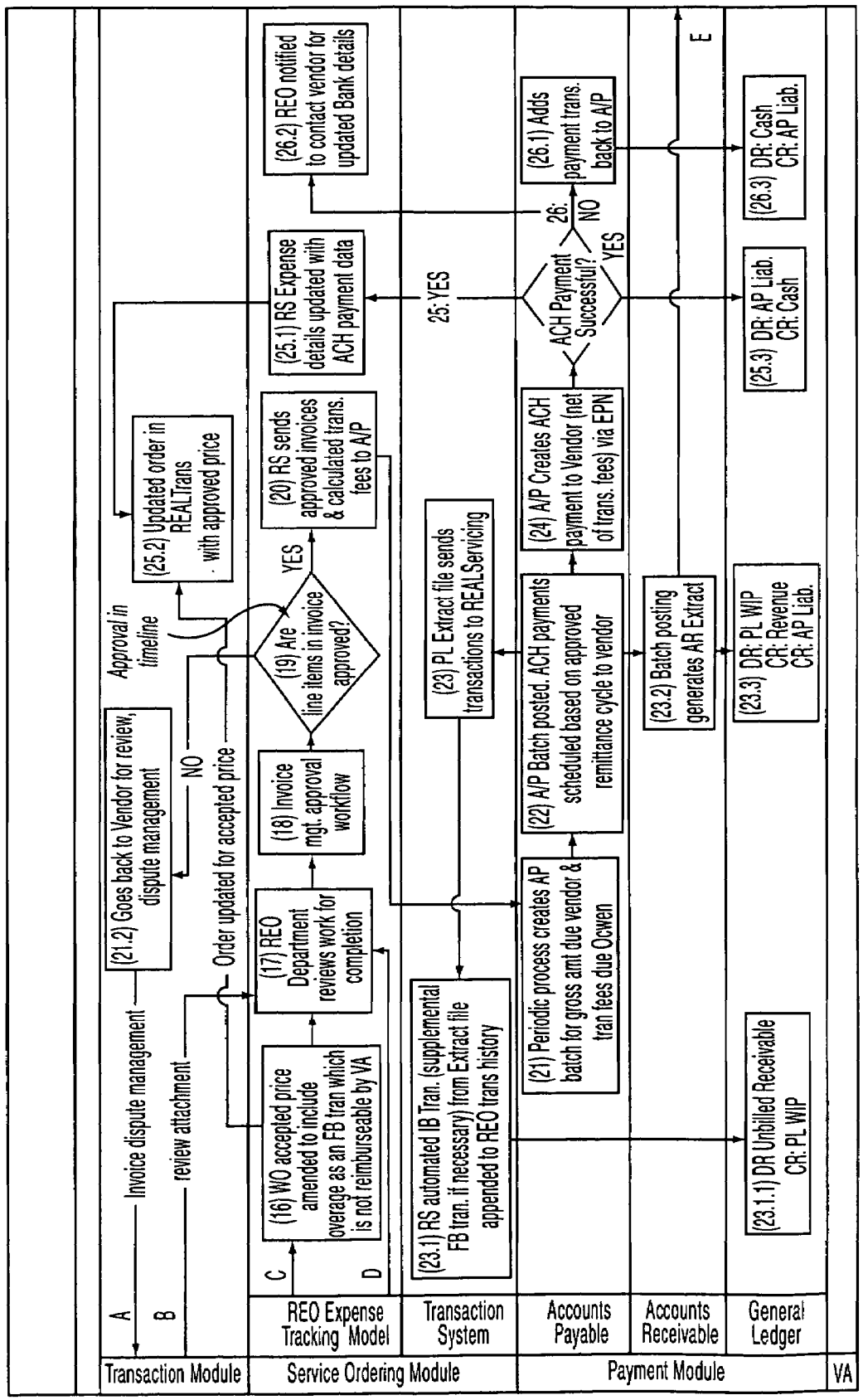

FIGS. 1B-1C depict a flow chart illustrating the functionality of interacting components for an example payor (VA) and example vendor, in accordance with an exemplary implementation of an embodiment of the present invention. In step 1, a vendor begins by enrolling in the transaction system. In step 2, the vendor and subvendor list is updated as new vendors sign up in the transaction system. In step 3, a pre-note is used to validate the bank information provided by the vendor. If the bank information includes any invalid data, in step 4, the invalid data is sent back, for example, to the vendor and to the REO. The vendor may then choose to enroll in the transaction system with modified information in step 1.

In step 5, a budget is created or modified, for example, by an REO employee and within payor guidelines. The budget includes, for example, various work items to be performed and prices for each work item. The budget may be, for example, the budget for selling a property, and may include work items associated with selling the property, such as, for example, performing an inspection. Within the system, each work item may be associated with a work order, which is a request for a vendor to provide particular goods or services for a particular price.

In one embodiment, the present invention uses a budget that is created, for example, by an REO employee in accordance with payor specifications. The budget includes such expenses as, for example, marketing expenses (such as agent fees, brochure or advertising fees), property maintenance fees (such as utilities, taxes, insurance, lawn care, or cleaning), repairs, inspections, rehabilitation, seller concessions, and closing costs. The budget may also include recurring items, which are items that require recurring payment (monthly, weekly, daily, etc.). A process is utilized to compare the original budget approved by the REO manager to the actual expenses being occurred.

In one embodiment, the system provides features for recommending a marketing strategy for the property, either as-is or repaired. This may be accomplished by performing a calculation, taking into account factors such as an estimated as-is property value, an estimated repaired property value, and estimated repair costs. The system also provides features that allow a user, such as an REO employee, to enter anticipated expenses for the property and compare budgets. In one embodiment, each budget may be associated with or include a business plan, which describes the rationale behind a particular marketing strategy for the property. A user can view or modify an existing business plan, or can create new business plans. In one embodiment, a business plan may include a "summary" field, which contains information such as a description of the property, any needed repairs, estimated costs, any recommendations made by the broker, proposed asking price, and any other information that may be useful in determining how to market the property. The business plan also includes a "plan of action" field, which contains information on how the property will be marketed, such as, for example, "List property as-is for $25,500 and if no offers in 30 days reduce." The business plan may also include an expiration date, and upon expiration of the business plan, the system will alert the user that the business plan must be modified or replaced. The user also has access to a budget spreadsheet, which lists all budgets and/or business plans that have been developed for the property.

After a budget has been developed, in step 6, the budget is approved. This includes, in step 6.1, determining whether the budget or expense type is above payor limits. This may be accomplished, for example, by making a query to a system table in a database, the system table including payor budgets by state and expense type. For example, a payor may specify that in the state of Virginia, the maximum expense for a flood order is $225, and the maximum budget is $5500; while in Texas, the maximum expense for a flood order is $150, and the maximum budget is $6000. This information is contained, for example, in a system table in a database, and a query to the database is used to determine whether the budget is above payor limits. The budget may be determined to be above payor limits if one line item exceeds the allowed line item maximum, or if the total budget exceeds the allowed budget maximum. If the budget is not above payor limits, the method continues in step 6.7.2.

If it is determined that the budget is above payor limits, in step 6.2, it is determined whether an REO manager approves the overage. If the manager does not approve the overage, the budget is modified in step 5.

If the manager approves the overage, in step 6.3, the overage is sent, for example, to the payor approval queue. This occurs, for example, if the budgeted amount for a particular order or line item is greater than a predetermined controlled amount, or if the total budgeted amount is greater than a predetermined allowable amount for the state in which the property is located. In step 6.7, it is determined whether the payor approves the overage. If the payor approves the overage, in step 6.7.1, a note is made of the approval, such as, for example, by adding a payor approval identification (ID) to each work order.

In step 6.7.2, the controlled amount is added to the order for controlled expenses. In step 7, the REO assigns a vendor and subvendor to a work order for work specified in the budget. This may be performed automatically or manually. The vendor and subvendor are chosen, for example, from the vendor and subvendor list of the payment module.

One embodiment of the present invention provides for a bidding process. In this embodiment, various vendors may create bids to perform work as specified in a work order or in a line item in a budget. Each of the bids includes, for example, a cost estimate and other information. One of the bids may be selected, and the vendor will be assigned to the work order. In one implementation, selecting a bid occurs automatically based on one or more criteria. For example, the bid with the lowest cost estimate may be selected. In another implementation, a user may select a bid.

In step 8, the new work orders and payees are stored in the transaction system. In step 9, it is determined whether the vendor has changed the price that will be charged for the goods or services. If the vendor has changed the price, the method returns to step 5, wherein the REO creates a new budget.

If the vendor has not changed the price, the vendor confirms the order in step 10, and in step 11, delivers the order, such as providing goods or services, and creates an invoice. This includes, for example, the vendor uploading the required invoice documents in step 11.1. The vendor may complete these documents to create an invoice.

In step 12, the vendor transaction fees are calculated, and in step 13, information from the transaction module is extracted to the service ordering module. This information includes, for example, invoice details, transaction fees, and payor approval information.

In step 14, it is determined whether the amount of the invoice for a work item is less than or equal to the amount specified in the work order or a preset overage tolerance for the work item. If the amount of the invoice is less than or equal to the amount specified in the work order or the preset overage tolerance, the method continues in step 17 of FIG. 1C.

If the amount of the invoice is greater than the amount specified in the work order, in step 15, it is determined whether the REO manager approves the overage. If the REO manager does not approve the overage, the method continues with dispute management. This may result in the vendor creating a modified invoice in step 11. If the REO manager approves the overage, it is determined in step 15.1 whether the invoiced price is greater than the controlled amount specified in the system table. If the invoiced price is not greater than the controlled amount, in step 15.1.1, it is determined whether the revised budget is greater than the payor approved budget. If the revised budget is not greater than the payor approved budget, the method continues in step 17 of FIG. 1C.

If the invoiced price is greater than the controlled amount in step 15.1 or if the revised budget is greater than the payor approved budget, the method continues in step 16 of FIG. 1C.

Referring now to FIG. 1C, in step 16, the accepted price specified in the work order is amended to include the overage transaction, which is not reimbursable by the payor. In step 17, the REO reviews the work done for completion.

In step 18, the invoice is sent to management for approval of the workflow. In step 19, it is determined whether the line items in the invoice have been approved. If one or more of the line items have not been approved, in step 21.2, the unapproved line items are sent to the vendor for review and dispute management. This may result in the vendor creating a new invoice 11.

If the line items have been approved, in step 20, the service ordering module sends the approved invoices and transaction fees to AP. In one embodiment, when an invoice is received and approved, a user, such as an REO employee, creates a voucher by selecting from a list of outstanding work orders that match those on the invoice. The list may also include recurring items that are now due. The user can also create a voucher for an invoiced item for which no work order exists. The user enters verification information, such as the number of items and the total cost. Alternatively, the user may enter a new voucher into the system by inputting information into an electronic form. A batch of vouchers is automatically approved if every voucher in the system is approved. Alternatively, the user can manually approve a batch or an individual voucher. The approved batch is fed to the AP system for payment.

In step 21, the payment module periodically creates an accounts payable batch for the gross amount due to the vendor and for the transaction fees due to the REO. In step 22, the accounts payable batch is posted and payments via an ACH are scheduled. The payments are scheduled, for example, based on an approved remittance cycle to each vendor.

In step 23, transactional information is extracted and sent to the service ordering module. In step 23.1, the transactional information is appended to the REO transaction history for the property. In step 23.1.1, unbilled receivables and other account information is stored in the payment module. The information stored in the payment module includes cash receipt (CR) information, which describes income on the property, and debit receipt (DR) information, which describes costs incurred in conjunction with the property.

In step 23.2, the batch posting of step 22 is used to generate information concerning accounts receivable for the provider of the software services. In step 23.3, information concerning the accounts receivable is stored in the Infinium module.

In step 24, the payment module creates an ACH payment to the vendor. The payment amount is, for example, the amount due for services less the transaction fee due the REO.

In one embodiment of the present invention, alternative methods of payment are provided. For example, some vendors may wish to be paid not via an ACH payment, but rather via an alternative method, such as a check. The system of the present invention provides for alternate payment methods, and provides functionality to record payments and transactions made by means other than an ACH. The present invention also, for example, provides functionality to assist in other methods of payment, such as functionality to generate and print a check.

If the payment is successful, in step 25.1, expense details in the service ordering module are updated with payment information, and in step 25.2, the order price stored in the transaction module for the particular goods or services may be updated. This price may be updated based on the work order expected price of step 16 as well as the payment data of step 25.1. In step 25.3, information concerning the payment is written to the payment system.

If the ACH payment is not successful, in step 26.1, the payment transaction is added back to accounts payable. In step 26.2, the REO is notified to contact the vendor for updated bank details. In step 26.3, information concerning the failed payment is written to the Infinium module.

Figure 1D:
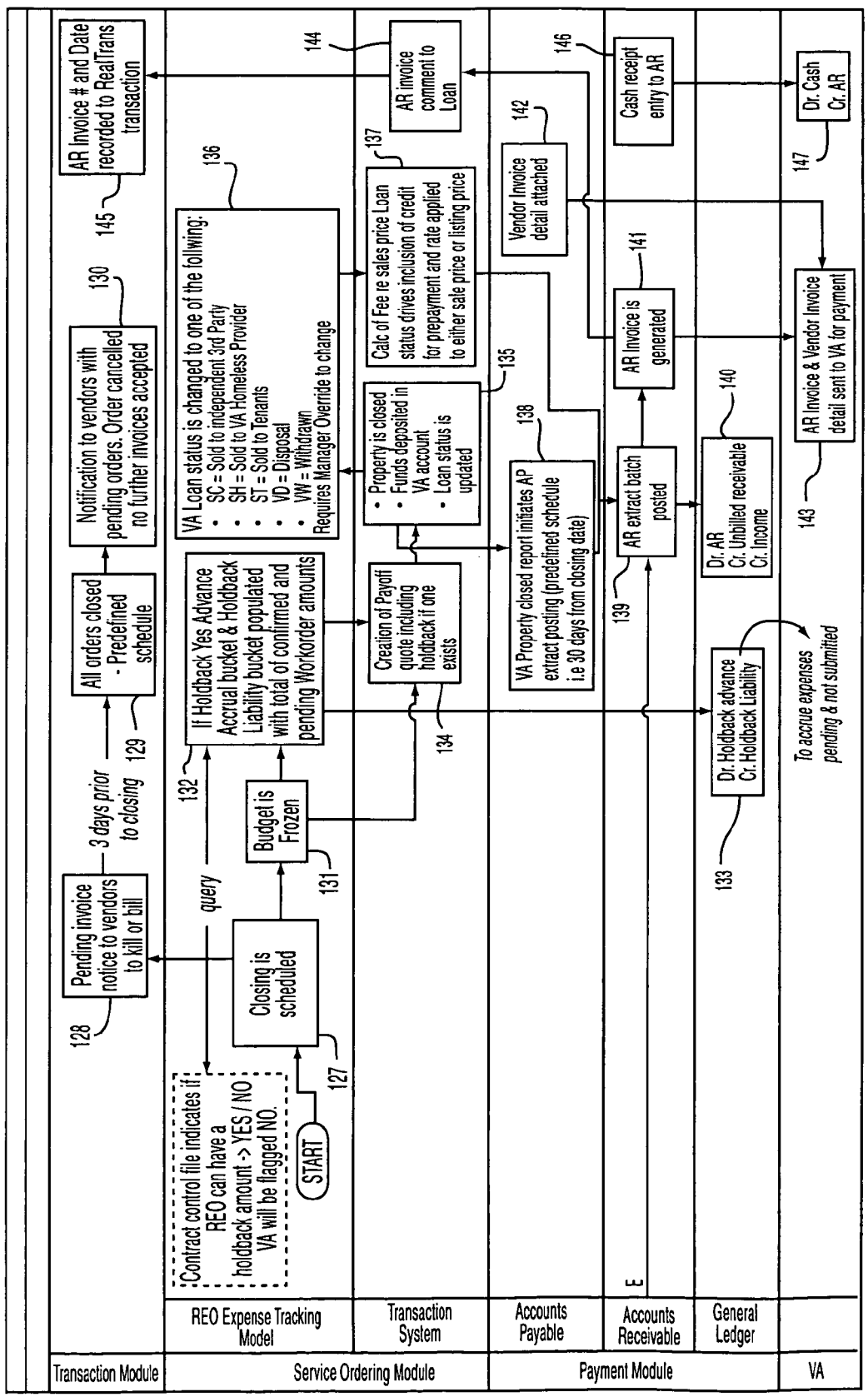

Referring now to FIG. 1D, a method for closing on a property or otherwise completing a transaction begins in step 127, when a closing is scheduled. In step 128, an invoice of all pending work orders is sent to each vendor. This invoice includes a notice to the vendor that each pending or outstanding work order should be either completed and billed, or cancelled. In step 129, all pending work orders are closed. In one embodiment, this is performed at a predetermined time, such as three days before the closing of the property. In step 130, a notification is sent to each vendor with one or more pending work orders. The notification advises the vendor that the pending work order(s) has been canceled and that no further invoices will be accepted.

In addition, in response to the closing scheduled in step 127, the budget is frozen in step 131. In step 132, it is determined whether the REO can have a holdback amount. This is accomplished, for example, by querying a database. If the REO can have a holdback amount, for example, an Advance Accrual bucket and a Holdback Liability bucket in the service ordering module are populated with the total of confirmed and pending work order amounts. In step 133, the holdback advance and the holdback liability are stored in the payment module.

In step 134, a payoff quote is created. This includes any existing holdback. In step 135, the property is closed, funds are deposited in the payor account, and the payor loan status is updated. As shown in step 136, the payor loan status may be set to one of the following: sold to independent third party, sold to payor homeless provider, sold to tenants, disposal, or withdrawn. Once the loan status has been set, changing loan status requires a manager approval.

In step 137, a fee due the provider of software services is calculated. Information used to calculate the fee includes, for example, the loan status drives, the sales price or mortgage payment of the property, and a rate applied to the sales price, the mortgage price, or the listing price. In the event prepayment has been made, the prepaid amount may be subtracted from the fee due.

In step 138, a property closed report initiates an accounts payable extract posting. This is performed, for example, on a predetermined schedule, such as 30 days after the closing date. In step 139, the information from steps 137 and 138 is used to generate and post an accounts receivable extract batch. In step 140, information concerning accounts receivable, unbilled receivables, and income is written to the Infinium module.

In step 141, an accounts receivable invoice is generated. In step 142, a vendor invoice detail is generated. In step 143, the accounts receivable invoice generated in step 141 and the vendor invoice detail generated in step 142 are sent to the payor for payment.

In step 144, information from the accounts receivable invoice is written to the service ordering module as a comment concerning the loan. In step 145, information from the accounts receivable invoice, such as, for example, an invoice number or identifier, is written to the transaction module, along with the date.

In step 146, cash received is entered into the accounts receivable account, and in step 147, information concerning the cash receipt (CR) is written to the payment module.

In one embodiment of the present invention, a user, such as an REO employee, has access to settlement processing features. Settlement processing features are used, for example, at the completion of a transaction, such as when a property has an accepted offer. A user performing settlement processing selects the property that has the accepted offer. The user is then presented with a settlement update window, which includes, for example, standard codes and descriptions of line items on a form, such as the HUD-1 form from the U.S. Department of Housing and Urban Development.

To enter information for a line item on the form, the user may select the line item and enter the amount paid for that line item. For example, the user may select "City/town taxes paid by seller" and enter the amount paid. Some line items in the form, such as, for example, "Settlement charges to seller," will allow the user to detail sub-items for the line item. Selecting one of these line items brings up a sub-item window, wherein the user can list one or more sub-items and the cost for each.

In one embodiment of the present invention, a user, such as an REO employee, has access to expense deduction features. Some expenses relating to work orders that have been paid, or have not yet been paid, can be reimbursed to the REO or to the vendor by deducting the amount from the sales proceeds. Expense deduction features are used, for example, to deduct these fees from the sales proceeds after a property has closed.

The user selects the property and then selects the expenses to be deducted. The user then selects to pay the vendor through the AP system. The user can dictate how the vendor will be paid: either (1) directly at the time of closing from the sales proceeds, (2) reimbursed to the vendor at the time of closing, or (3) reimbursed to the REO at the time of closing, and the REO then pays the vendor directly through the AP system.

In one embodiment of the present invention, fees are defined as charges made by the REO to the payor for services performed. Example fees include delivery charges and postage charges. A user of the system, such as an REO employee, has access to fee deduction functionality. The fee deduction features are similar to the expense deduction features, except that the user selects fees rather than expenses to be deducted form the sales proceeds.

In one embodiment of the present invention, the expense tracking, ordering, invoicing, and payment features interface with various external software applications. For example, a payor or vendor may use a spreadsheet program to create a budget, an ordering program to create an order for goods or services, or an invoicing program to create an invoice. The present invention may interact with these external software applications to track expenses, place orders, and make payments. Alternatively, a payor or vendor may use budgeting, ordering, or invoicing programs provided by the REO in conjunction with the present invention.

FIG. 2 is an overview representative diagram of various system elements of an embodiment of the present invention. As shown in FIG. 2, the system includes a requestor 150 and a vendor 151. The system also includes one or more databases or other data repositories. These data repositories include, for example, service ordering storage 152, transaction storage 153, accounts receivable storage 154, General Ledger (GL) storage 155, and accounts payable storage 156. The accounts receivable storage 154, General Ledger (GL) storage 155, and accounts payable storage 156 may be contained in the Infinium module. The data repositories include computer-readable instructions for carrying out functions associated with electronic billing, payment, and expense tracking. The data repositories further include information, such as vendor, property, budget, payor, and other information used in carrying out billing, payment, and expense tracking functionality.

The system further includes one or more software modules, which are stored, for example, as computer-executable instructions, in the data repositories 152-156 or elsewhere. The software modules include functionality for performing various transactions for expense tracking. Software modules included in the system are, for example, an invoice creation module 157, a billing module 158, a billing presentment module 159, a charges module 160, a pricing module 161, and a vendor enrollment/setup module 162. Other software modules included in the system are, for example, an approval module 163, a dispute resolution module 164, an invoice module 165, a constructive receipt module 166, and a payments module 167.

Figure 3:
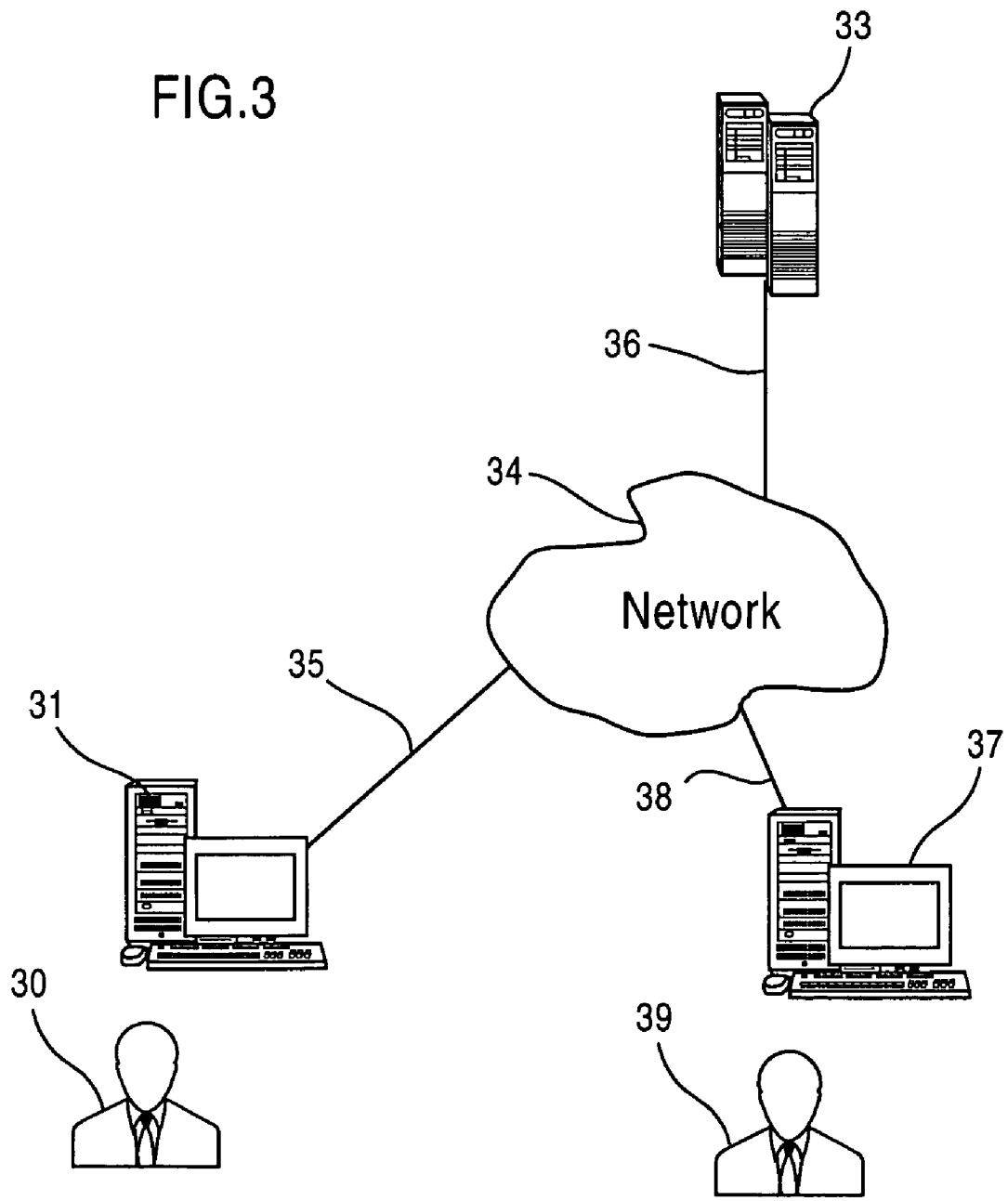
FIG. 3 presents an exemplary system diagram of various hardware components and other features in accordance with an embodiment of the present invention.

FIG. 3 presents an exemplary system diagram of various hardware components and other features in accordance with an embodiment of the present invention. As shown in FIG. 3, in an embodiment of the present invention, data and other information and services for use in the system is, for example, input by a vendor 30 via a terminal 31, such as a personal computer (PC), minicomputer, mainframe computer, microcomputer, telephone device, personal digital assistant (PDA), or other device having a processor and input capability. The terminal 31 is coupled to a server 33, such as a PC, minicomputer, mainframe computer, microcomputer, or other device having a processor and a repository for data or connection to a repository for maintained data, via a network 34, such as the Internet, via couplings 35, 36. In one embodiment, a payor 39 also inputs information/data via a terminal 37 coupled 38 to the network 34.

In operation, in an embodiment of the present invention, via the network 34, vendor and payor data and/or other information is communicated with the server 33. The server 33, which may optionally also include capability for communication with an electronic payment system, for example, receives, converts, formats and resolves the transaction, stores data regarding the transaction, documents the transaction (e.g., electronically), and assures payment completion.

Figure 4B:
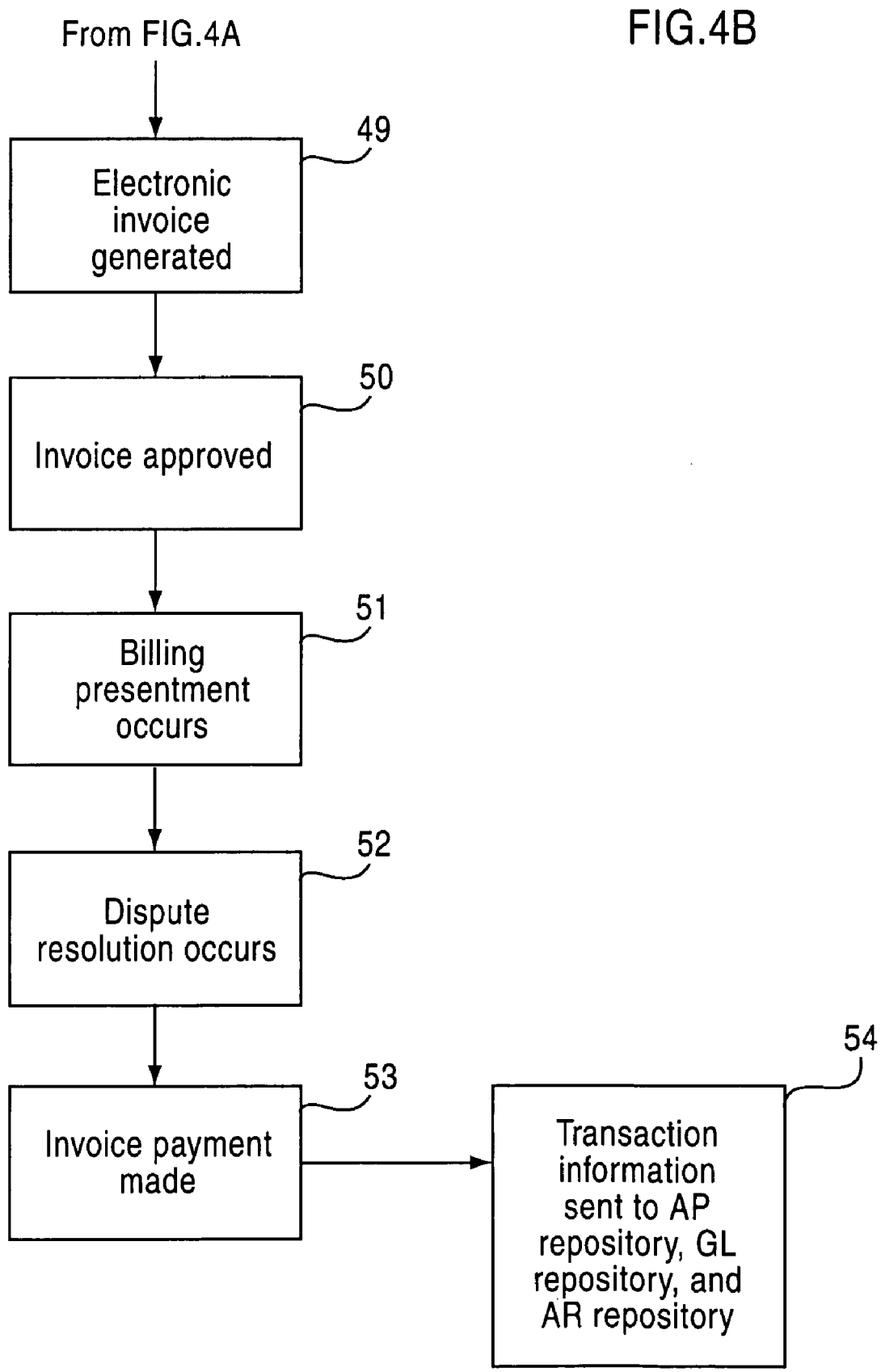

FIGS. 4A and 4B show an example flow diagram of a process for providing ordering, invoice presentment, and payment, in accordance with an embodiment of the present invention. As shown in FIG. 4A, a request for an ordered item, such as a good or service (e.g., order placement) first occurs 40, such as between a requestor (e.g., payor) and a transaction repository (e.g., transaction database). A receivable call (e.g., unbilled and in real time) is then generated from the transaction repository to a charging system 41. The receivable call includes, for example, information about accounts receivable, such as payment due from the payor for the ordered item. A journal entry or other record is transmitted to a general ledger (GL) repository (e.g., database) 42.

As further shown in FIG. 4A, a pricing module is then accessed to determine the vendor/requestor price for the requested good or service 43. The order is placed with the vendor 44. A confirmation process then occurs 45, such as passing of a final agreed upon price and an original price through a charging module. A call (e.g., unbilled and in real-time) is then generated from the transaction repository to the vendor 46. The call includes, for example, information about accounts payable, such as payment due to the vendor for the ordered item.

In an embodiment of the present invention, upon approval, a communication occurs from the vendor to the transaction repository and to the requestor 47. The transaction repository then communicates approval to the charging system 48, and an electronic invoice is generated 49. The invoice is approved 50, billing presentment occurs 51, any dispute resolution occurs 52, and payment is made 53. Information regarding the transaction is then communicated to an accounts payable (AP) repository, the GL repository, and an accounts receivable (AR) repository 54.

Figure 5:
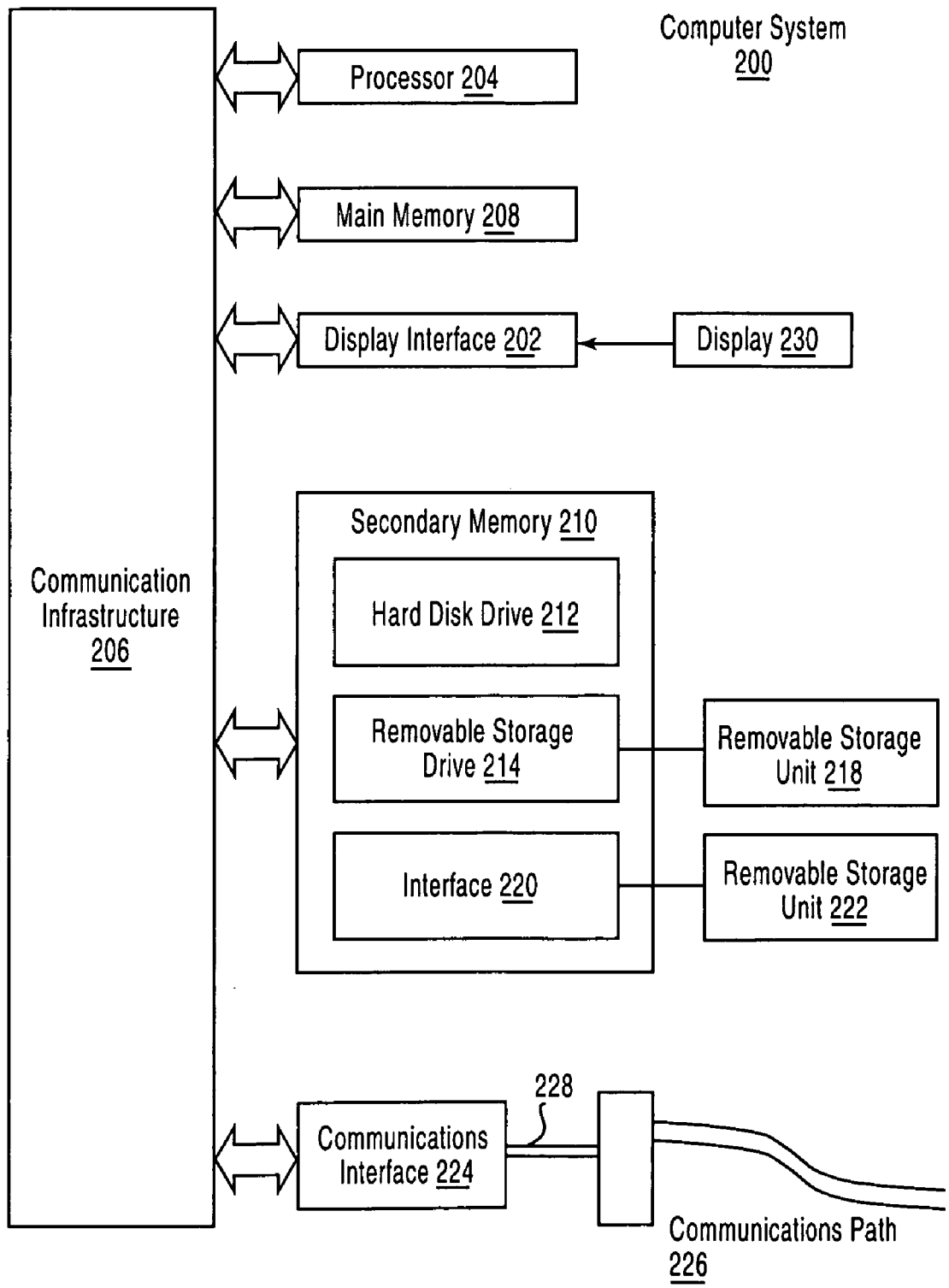
FIG. 5 illustrates a computer system for carrying out expense tracking functionality, in accordance with an embodiment of the present invention.
Figure 8:
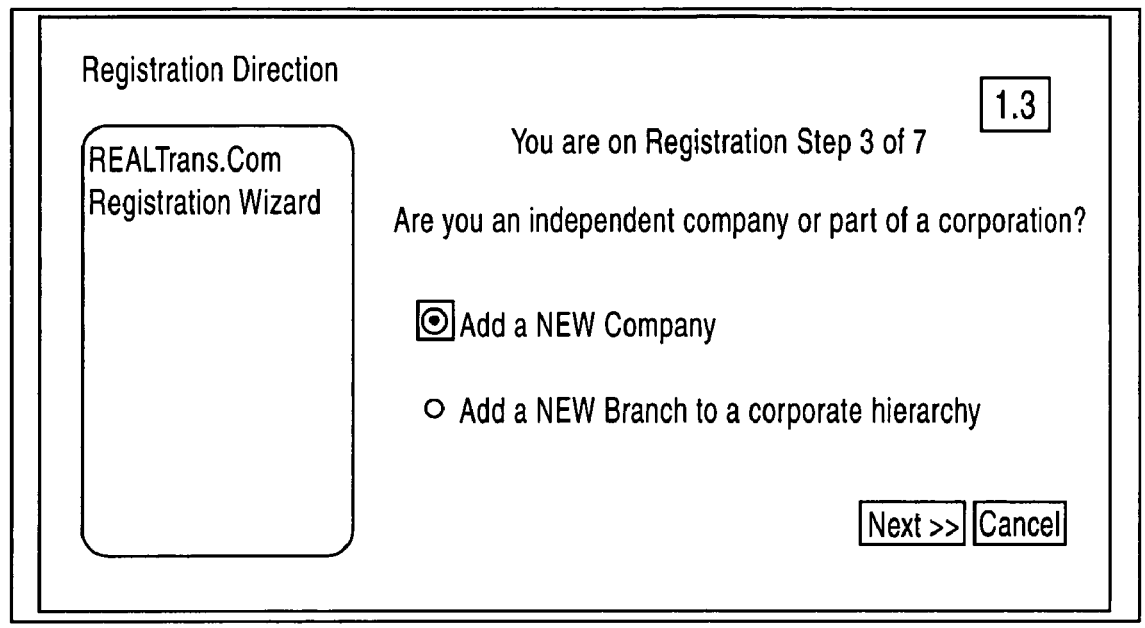
Figure 13:
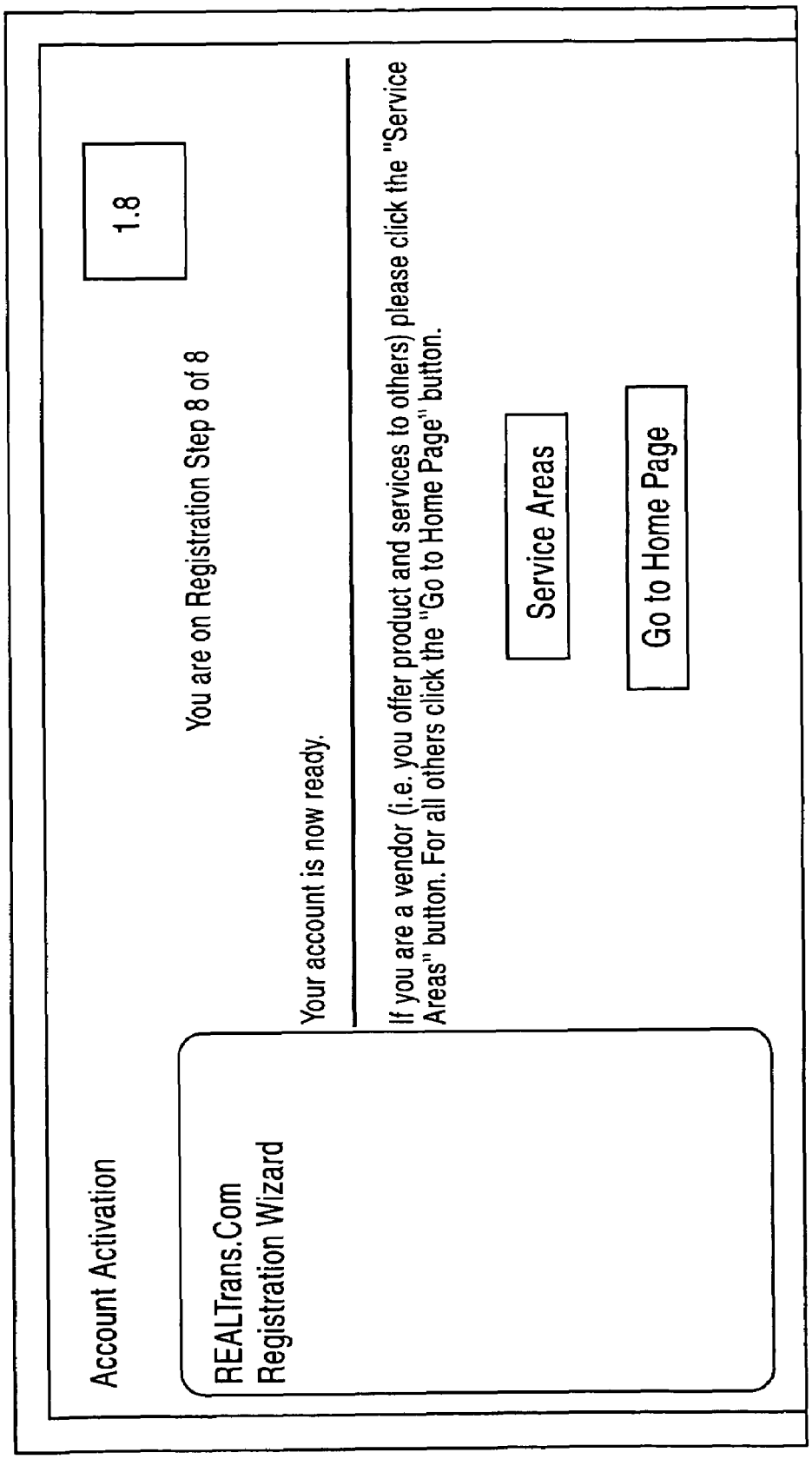

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 5.

Computer system 200 includes one or more processors, such as processor 204.

The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

FIGS. 6-34 are example GUI screens that are presented to various users in accordance with an embodiment of the present invention. In this particular embodiment, the transaction module is referred to as a REALTrans module, the service ordering module is referred to as a REALServicing module, and the payment module is referred to as an Infinium module. FIGS. 6-17 are example GUI screens that are presented to a user wishing to enroll a vendor in the transaction module, or REALTrans system, to provide goods or services.

A user, such as a vendor, wishing to enroll in a system of the present invention, such as a REALTrans system, is first presented with the GUI screen illustrated in FIG. 6, and is presented with user agreements including a new transaction agreement. If the user agrees to the terms, for example, by selecting a button on the screen, the user is presented with the GUI screen of FIG. 7. This GUI screen alerts a user that the enrollment process will require certain information, such as, for example, bank account information. The GUI screen of FIG. 8 requests registration information from the user, such as, for example, whether the user wishes to add a new company or add a new branch to a corporate hierarchy.

The GUI screen of FIG. 9 prompts the user to enter information in various fields. The information includes, for example, company name, business name, type of business (such as, for example, individual, sole proprietor, corporation, partnership, or other), whether the business is exempt from backup withholding, tax identification number or social security number, business address, tax certification information, and personal information (such as, for example, address, phone number, fax number, cell phone number, and email address).

The GUI screen of FIG. 10 prompts the user to enter the role the business will play in the system. The roles played by one business or individual may be represented differently in different modules of the system. For example, in one embodiment, the role of a business or individual is described in the REALTrans module as one of the entries shown in FIG. 10. In embodiments, the role of a business or individual dictates whether their information will be stored in the REALTrans module, a service ordering module such as a REALServicing module, a payment module such as an Infinium module, or some combination thereof. Storing information in the Infinium module in some cases includes creating an Accounts Payable (AP) account for the business or individual. The type of business or individual is described in the REALTrans module as one of appraiser, attorney, automated valuation service provider, builder, correspondent lender, credit bureau, flood determination provider, government sponsored entity, investor, lender, management firm, mortgage exchange, mortgage insurance provider, pest inspection provider, real estate agent, servicer, special servicer, sub-servicer, survey provider, title company, verification service provider, or wholesale lender. The type of business or individual is described in the REALServicing module as one of appraiser, association/condo, attorney, auto insurance, bank, bankruptcy court, bankruptcy trustee, client, insurance agency, insurance company, investor, land-no insurance, miscellaneous, not applicable, optional insurance, real estate agent, reserve replacement, servicer, sub-servicer, tax service, third party, US trustee, interim Housing and Urban Development representative, lockbox. The type of business or individual is described in the Infinium module or AP system module as one of appraisal services, employee, facilities and service provider, government and regulatory, non employee individuals, law firms and related, professional services, property management and related, realtors, technology and related, title companies.

Allowing corporations, entities, and individuals to enroll as "vendors" in the system provides, for example, for automatic payment to these corporations, entities, and individuals. For example, allowing an attorney to enroll as a vendor allows for expense tracking and automatic payment of attorney's fees in conjunction with a foreclosure or other legal service. Similarly, allowing a city, county, or state to enroll as a vendor provides for automatic payment of taxes and other government fees., and allowing a utility company to enroll as a vendor provides for automatic payment of utility bills. Other expense tracking, ordering, invoicing, and payment functionalities for other vendor types are possible.

In one embodiment of the present invention, a user may act as an agent for a vendor within the system. For example, a user such as a real estate broker may enroll a vendor, such as a landscaper, in the system. This allows, for example, the landscaper to receive automatic payment without expending the time and effort to enroll in the system.

The GUI screen of FIG. 11 prompts the user to enter credit card details, including, for example, cardholder name, type of card, card number, expiration date, and billing address. The GUI screen of FIG. 12 prompts the user to enter bank details, including, for example, bank name, bank address, bank account number, and bank routing number. The GUI screen of FIG. 13 alerts the user to the fact that the account has successfully been created, and allows the user to select "Service Areas." The user selects "Service Areas" if the user is a vendor. This allows the user to specify the areas the vendor serves.

After selecting "Service Areas," the user is displayed the GUI screen of FIG. 14, and is prompted to enter a service area name and service area description. The GUI screen of FIG. 15 prompts the user to enter the states in which the vendor does business. The GUI screen of FIG. 16 prompts the user to enter the counties in each selected state in which the vendor does business. The GUI screen of FIG. 17 prompts the user to enter the zip codes in each selected county in which the vendor does business.

Once the vendor has been enrolled, an interface between the REALTrans and REALServicing modules captures the new vendor for upload to the REALServicing module, and then to the Infinium module. In one embodiment, a batch process uses File Transfer Protocol (FTP) to periodically send information about new vendors to both the REALServicing and Infinium modules. The information is also sent to an accounts payable database. The information includes, for example, vendor name, vendor identification number, vendor type, vendor contact information (type, phone type and number, email) vendor address, vendor class, and vendor bank details (bank routing number, account number, account name).

The bank data is then validated, for example, by running a pre-note. The pre-note may be a regular ACH transaction with a zero dollar amount. Failed payments or pre-notes are sent to a queue to be reviewed by a staff member. The staff member then contacts the vendor to validate and correct the bank information, and the payment or pre-note is resubmitted using the corrected information.

When a REO is ready to market a property, the REO creates a budget for the property. The budget must comply with predetermined limits set by the payor contract. Example total budget limits for one payor, listed by state, are shown in the table of FIG. 18. In addition, each line item or transaction in the budget must comply with limits set by the payor for each expense type. The GUI screen of FIG. 19 illustrates sample expense types for each line item or transaction in the budget.

FIGS. 20-34 are example GUI screens that are presented to a user wishing to perform and manage various transactions associated with the sale or management of a property. The GUI screen of FIG. 20 illustrates a budget spreadsheet created for a property. The user adds items to the budget spreadsheet and submits the budget, for example, by clicking a "submit" button.

After the budget has been submitted, the system identifies whether any line items in the budget exceed the limits the payor has set, or whether the total budget exceeds the payor limit. If line items in the budget exceed the limits or the total budget exceeds the payor limit, an REO manager has a choice to approve or deny the overage. The GUI screen displayed to the manager is shown in FIG. 21. The manager has the option to approve each line item. For example, by checking a check box. If the overage is denied, the budget is sent back to the REO for modification.

After the budget has been approved by the manager, a workflow is sent to the payor, describing the line item transactions that will occur. An email notification is sent to the payor. The email notification is illustrated in FIG. 22. The notification includes information concerning the overbudget line item and may prompt the payor to approve the line item. The payor may approve the line item, or may select "Review Order in REALServicing."

Selecting "Review Order in REALServicing" will display the approval report screen displayed in FIG. 23. The approval report screen shows all line items open for payor approval, and allows the payor to approve the line items From the approval report screen, the user can access the budget summary illustrated in FIG. 24. The user clicks on a specific line item to view information for the line item, as illustrated by the GUI screen of FIG. 25. From the GUI screen of FIG. 25, the user can choose to approve the overage.

After the REO manager and the payor have approved any overages, a work order for each line item is created, for example, by the REALServicing module. The GUI screen of FIG. 26 is displayed to the REO. From the GUI screen of FIG. 26, a user may select a vendor and/or subvendor for each work order by selecting from the list of vendors and subvendors in the REALTrans module. This may be accomplished, for example, by selecting from a drop-down box. The work order is then stored in the REALTrans and REALServicing modules.

After a work order has been created and a vendor selected, the vendor may change the price on the work order. If this occurs, the change is reflected in the budget and stored in the REALServicing module, and the budget must be approved again. The budget may be approved automatically, or by manager and payor approval, depending on whether the revised budget contains an overage.

After the vendor has been selected and the budget re-approved if necessary, the vendor is presented with the GUI screen of FIG. 27, and may choose to confirm, decline, or conditionally confirm the order. If the vendor chooses to conditionally confirm the order, the vendor may input conditions, such as, for example, a modified due date, a modified order price, and modified order costs, and the order is sent to the REO and the payor for approval of the conditions.

If the vendor chooses to decline the order, the REO chooses another vendor for the order. The REO may then select "Order Inquiry" to view the GUI screen of FIG. 28. The REO can view outstanding orders that have been deleted or conditionally confirmed, and can select an order and update the vendor.

The vendor delivers the order or otherwise provides goods or services described in the work order, and creates an invoice. The vendor may create the invoice using the electronic invoice form of FIG. 29. The invoice contains a delivered price, which is the price the vendor charges for the goods or services. This amount may be the confirmed order amount in the budget, or another amount that is either higher or lower than the confirmed order amount.

The REALTrans module calculates the transaction fee due to the provider of software services. This may be or include a flat transaction fee, or a percentage of invoiced amount or the confirmed order amount.

Figure 30:
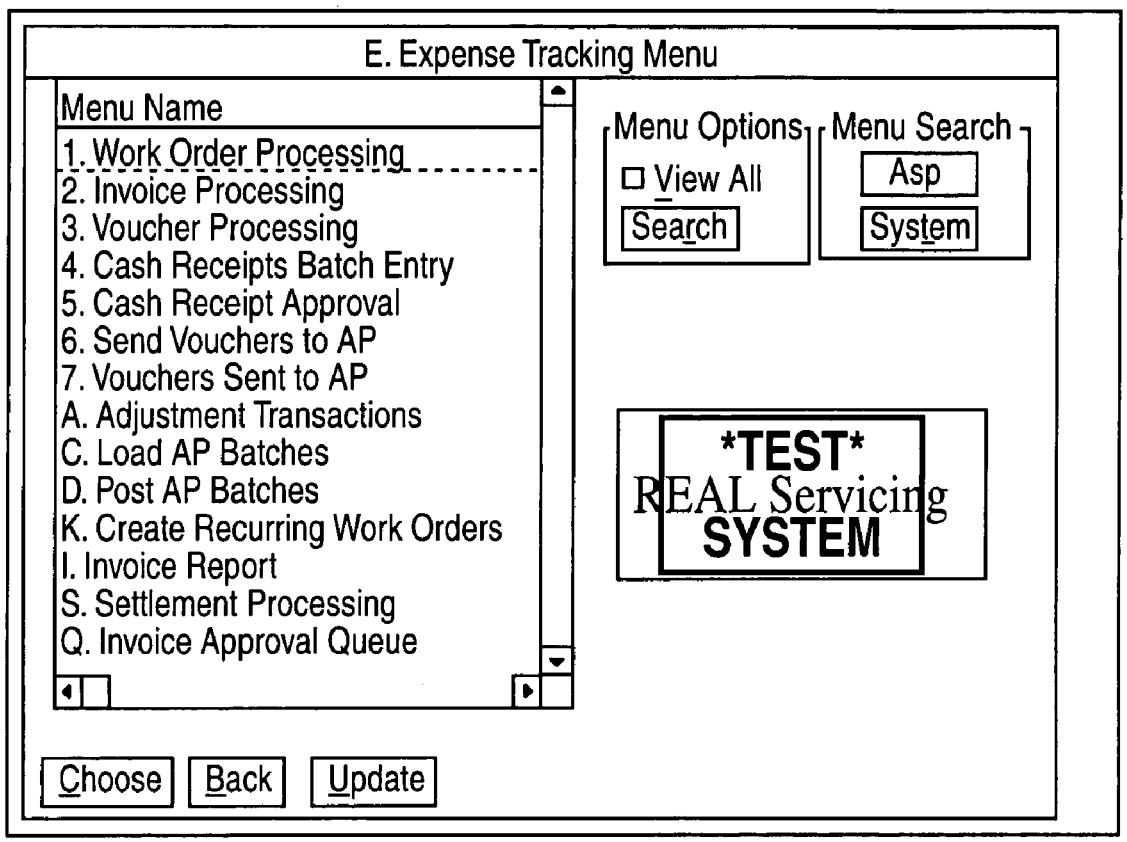

The invoice is then sent to an approval queue in the REALServicing module. From an Expense Tracking menu in the REALServicing module, a user may select "Invoice Approval Queue," as shown in FIG. 30, to view pending or approved invoices. The invoice may be approved automatically or by the user. Approval includes, for example, comparing the invoiced amount to the confirmed order amount or checking whether the payor has approved an overage.

Certain invoices are queued to the REO manager for approval. These invoices include, for example, invoices that exceed the payor-approved allowable amount, the pre-approved budget. In one embodiment, the REO manager is provided with the GUI screen of FIG. 31, which allows the manager to select certain transactions. The manager may search all transactions, rejected transactions, or transactions over the payor approved amount (VA overages), and may enter other search criteria as well.

The REO manager will then be presented with a report, such as that shown in the GUI screen of FIG. 32. From the report, the REO manager can select a particular invoice, and is then presented with details for the invoice, as shown in the GUI screen of FIG. 33.

From the GUI screen of FIG. 33, the REO manager can approve the overage, and the budget in the REALServicing module is amended to include the overage. The manager can also select "Not approved," in which case the work order is sent to the REALTrans module for dispute management.

If the revised budget exceeds the payor total budget limit, a note is made that the overage is not eligible to be reimbursed by the payor. If the invoiced amount is less than or equal to the budgeted amount, or if the invoiced price is equal to the payor approved price, the work order is sent to the REO to be validated. The REO is presented with the GUI screen of FIG. 34 to verify that the work was completed.

The invoice is then approved. In one embodiment, if the invoice is not approved within a predetermined time, an email notification may be sent to an alternate manager. Once the invoice has been approved, the REALServicing module sends the approved invoice and the calculated transaction fee to an accounts payable database. If the invoice is rejected, a transaction is sent to the REALTrans module changing the order status to "rejected."

In one embodiment, a periodic process creates an accounts payable (AP) batch for each invoice due each vendor less the transaction fee for the invoice. The total amount of each vendor invoice is uploaded into the Infinium module. The transaction fee associated with the vendor invoice is uploaded as a debit memo (negative invoice). The AP batch is posted, and ACH payments are scheduled based on approved remittance cycles to vendors.

An AP file feeds the REALServicing module. In one example, an approved invoice includes a transaction, the cost of which can be recovered by the payor, and a supplemental FB transaction. The accepted invoice is higher than the budgeted amount. Information about the invoice is written to the GL, and accounts payable details are transferred to accounts receivable. These unbilled invoices remain in accounts receivable until the property closes. A periodic interface extracts information from REALServicing to the GL.

The AP system generates an ACH payment to the vendor, net of the transaction fees. The vendor ACH payment is scheduled based on the payment date entered during invoice approval or based on the vendor file in the Infinium module. The Infinium module creates an ACH payment file on a periodic basis. The contents of the file are verified and payment is submitted to the vendor bank. If the payment is successful, the ACH details are sent to the REALServicing module, which updates the corresponding work orders and budget, and to the REALTrans module, which updates the order. The accounts payable and cash data in the Infinium module are updated accordingly.

If the ACH payment is not successful, the transaction amount is added back to accounts payable, and the REO is notified to contact the vendor for update bank details. The accounts payable and cash data in the Infinium module are updated accordingly.

After ACH payment has been made, the REO closing is scheduled. A pending close notice is sent to vendors with outstanding orders. The pending close notice contains a report of the work orders and pending vendor invoices, and alerts the vendor that remaining invoices must be submitted within a predetermined amount of time, such as, for example, three days. The work orders are then updated to reflect an estimate of the remaining amount to be billed by the vendors. A payoff quote is created.

The property is closed and the status of the property in the system is updated. The sale also initiates the calculation of a transaction fee that is based, for example, on the sales price of the property. A bill is created and sent to the vendor, and the system proceeds, (2) reimbursed to the vendor at the time of closing, or (3) reimbursed to the REO at the time of closing, and the REO then pays the vendor directly through the AP system.

In one embodiment of the present invention, fees are defined as charges made by the REO to the payor for services performed. Example fees include Federal Express charges and postage charges. A user of the system, such as an REO employee, has access to fee deduction functionality. The fee deduction features are similar to the expense deduction features, except that the user selects fees rather than expenses to be deducted form the sales proceeds.

In one embodiment of the present invention, a user, such as an REO employee, also has access to reporting pages, such as, for example, a statement of expenses, which includes an automatically generated report of all expenses invoiced on a property; and a financial snapshot, which provides a detailed list of all paid expenses associated with a property.

Example embodiments of the present invention have now been described in accordance with the above advantages. It will be appreciated that these examples are merely illustrative of the invention. Many variations and modifications will be apparent to those skilled in the art. For example, while the invention has primarily been described in terms of systems and methods for tracking expenses throughout a real estate transaction, the invention is applicable to other transactions, such as, for example, medical insurance reimbursements, construction projects, and retail or other transactions. For example, the invention can be practiced in conjunction with construction on a property. The budgeting ordering, and invoicing functionality can be used to create a budget for construction materials and labor costs, and to order and invoice these materials and costs. Other modifications will be apparent to those skilled in the art.

The invention claimed is:

1. A method for performing automated commerce ordering, comprising:

creating a budget for a transaction, the budget including a total price and at least one line item, each line item including an approved work order price, wherein one or more of the line items is created via a bidding process among a plurality of vendors; and upon verifying that the budget is within a budget maximum limit:

automatically approving the budget subsequent to the verification;

automatically creating a work order related to automated commerce for each line item, each work order specifying a vendor from the plurality of vendors to complete the work order;

transmitting the work order to the vendor electronically;

receiving invoice information from the vendor, the invoice information being received in response to the transmitted work order and including an invoiced price;

automatically approving the invoiced price upon verifying that the invoiced price is within the approved work order price or a preset overage tolerance; and automatically initiating payment of the approved invoice price to the vendor.

2. The method of claim 1, wherein payment of the approved invoice price to the vendor is provided via check or direct deposit.

3. The method of claim 1, wherein the budget exceeds a budget maximum if the total price exceeds a total budget maximum.

4. The method of claim 1, wherein the budget exceeds a budget maximum if the approved work order price exceeds a line item maximum.

5. The method of claim 1, further comprising:
if the budget exceeds a budget maximum, requiring a manager approval before approving the budget.

6. The method of claim 5, wherein the manager approval is provided using a workflow.

7. The method of claim 1, further comprising:
if the budget exceeds a budget maximum, requiring a payor approval before approving the budget.

8. The method of claim 1, further comprising:
receiving a confirmation from the vendor specified on the work order after the work order has been transmitted to the vendor.

9. The method of claim 8, wherein the confirmation specifies a modified price.

10. The method of claim 9, further comprising:
if the modified price is greater than the approved work order price, and the modified price is approved, reflecting the modified price as a budget variance.

11. The method of claim 10, further comprising:
if the invoiced price is greater than the approved modified price, performing dispute resolution.

12. The method of claim 1, wherein initiating payment includes a payor directly paying a vendor.

13. The method of claim 1, wherein initiating payment includes a payor making a payment to an account, and a vendor receiving payment from the account.

14. The method of claim 13, wherein the account is a bank account.

15. The method of claim 13, wherein initiating payment further includes receiving a file of required payments from an accounts payable system for a payor; and converting, formatting, and interfacing the received file for use in an automated clearinghouse system.

16. The method of claim 1, further comprising:
charging a transaction fee.

17. The method of claim 16, wherein the transaction fee is charged to a payor.

18. The method of claim 16, wherein the transaction fee is charged to the vendor.

19. The method of claim 1, wherein initiating payment includes making a batch posting, the batch posting including a payment to the vendor.

20. The method of claim 1, further comprising:
receiving at least one bid, each bid specifying a cost estimate and a vendor.

21. The method of claim 20, further comprising:
selecting one of the at least one bid.

22. The method of claim 21, wherein the vendor specified by the selected bid is selected to complete the work order.

23. The method of claim 1, wherein the specified vendor to complete the work order is selected automatically.

24. A computer program product comprising a computer usable medium having control logic stored therein for causing a computer to perform electronic expense tracking, the control logic comprising:

first computer readable program code means for creating a budget for a transaction, the budget including a total price and at least one line item, each line item including an approved work order price, wherein one or more of the line items is created via a bidding process among a plurality of vendors;

second computer readable program code means for verifying that the budget is within a budget maximum limit;

third computer readable program code means for automatically approving the budget subsequent to the verification;

fourth computer readable program code means for automatically creating a work order relating to automated commerce for each line item after approval of the budget, each work order specifying a vendor from the plurality of vendors to complete the work order;

fifth computer readable program code means for transmitting the work order to the vendor electronically;

sixth computer readable program code means for receiving invoice information from the vendor, the invoice information being received in response to the transmitted work order and including an invoiced price;

seventh computer readable program code means for automatically approving the invoiced price upon verifying that the invoiced price is within the approved work order price or a preset overage tolerance; and eighth computer readable program code means for automatically initiating payment of the approved invoice price to the vendor.

25. A system for electronic expense tracking, comprising:
a processor;
a user interface functioning via the processor;
a transmitter accessible by the processor for transmitting information; and
a receiver accessible by the processor for receiving information;
wherein a budget is created via the processor using information input into the user interface, the budget including at least one line item, each line item including an approved work order price, wherein one or more of the line items is created via a bidding process among a plurality of vendors; and
wherein, upon verifying that the budget is within a budget maximum limit:
the budget is automatically approved via the processor subsequent to the verification;
a work order relating to automated commerce is automatically created for each line item via the processor, each work order specifying a vendor from the plurality of vendors to complete the work order;
the work order is transmitted to the vendor via the transmitter,
invoice information is received from the vendor via the receiver, the invoice information being received in response to the transmitted work order and including an invoiced price;
the invoiced price is automatically approved via the processor upon verifying that the invoiced price is within the approved work order price or a preset price overage tolerance; and payment of the approved invoice price to the vendor is automatically initiated via the processor.

26. The system of claim 25, wherein the processor is housed on a terminal.

27. The system of claim 26, wherein the terminal is selected from a group consisting of a personal computer, a minicomputer, a main frame computer, a microcomputer, a hand held device, and a telephonic device.

28. The system of claim 25, wherein the processor is housed on a server.

29. The system of claim 28, wherein the server is selected from a group consisting of a personal computer, a minicomputer, a microcomputer, and a main frame computer.

30. The system of claim 28, wherein the server is coupled to a network.

31. The system of claim 30, wherein the network is the Internet.

32. The system of claim 28, wherein the server is coupled to the network via a coupling.

33. The system of claim 32, wherein the coupling is selected from a group consisting of a wired connection, a wireless connection, and a fiberoptic connection.

34. The system of claim 25, wherein the repository is housed on a server.

35. The system of claim 34, wherein the server is coupled to a network.

* * * * *